(12) United States Patent
England et al.

(10) Patent No.: US 7,788,669 B2
(45) Date of Patent: Aug. 31, 2010

(54) SYSTEM FOR ISOLATING FIRST COMPUTING ENVIRONMENT FROM SECOND EXECUTION ENVIRONMENT WHILE SHARING RESOURCES BY COPYING DATA FROM FIRST PORTION TO SECOND PORTION OF MEMORY

(75) Inventors: Paul England, Bellevue, WA (US);
Marcus Peinado, Bellevue, WA (US);
Bryan Mark Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1285 days.

(21) Appl. No.: 10/428,279

(22) Filed: May 2, 2003

(65) Prior Publication Data

US 2004/0230794 A1    Nov. 18, 2004

(51) Int. Cl.
*G06F 9/46* (2006.01)
*H04L 29/06* (2006.01)
(52) U.S. Cl. .................................. 718/104; 713/164
(58) Field of Classification Search ............. 713/164, 713/201; 710/33; 718/104
See application file for complete search history.

(56) References Cited

U.S. PATENT DOCUMENTS

| | | | | |
|---|---|---|---|---|
| 5,014,247 A * | 5/1991 | Albachten et al. | ...... | 365/230.05 |
| 5,369,749 A * | 11/1994 | Baker et al. | .................. | 718/104 |
| 5,502,822 A * | 3/1996 | Takebe | ........................ | 710/316 |
| 5,892,900 A | 4/1999 | Ginter et al. | ................ | 395/186 |
| 6,397,242 B1 | 5/2002 | Devine et al. | .................. | 709/1 |
| 6,496,847 B1 | 12/2002 | Bugnion et al. | ................ | 709/1 |
| 7,028,109 B2 * | 4/2006 | Saito et al. | ..................... | 710/33 |
| 7,228,375 B1 * | 6/2007 | Jacobson | ..................... | 710/317 |
| 7,281,266 B2 * | 10/2007 | Goodman et al. | ............. | 726/16 |
| 7,469,323 B1 * | 12/2008 | Tormasov et al. | ........... | 711/154 |
| 2002/0129277 A1 * | 9/2002 | Caccavale | ................... | 713/201 |

OTHER PUBLICATIONS

Bugnion, E. et al., "Disco: Running Commodity Operating Systems on Scalable Multiprocessors", *Proceedings of the 16th Symposium on Operating Systems Principles (SOSP)*, Oct. 1997, 1-14.

(Continued)

*Primary Examiner*—Meng-Ai An
*Assistant Examiner*—Camquy Truong
(74) *Attorney, Agent, or Firm*—Woodcock Washburn LLP

(57) ABSTRACT

Techniques are disclosed to support hosting of a first operating system by a second operating system, where the first system provides at least some of the infrastructure for the second system. A facility is provided whereby the second system can receive data from the first system without the first system being able to modify that data. The second system may use the first system's scheduler by creating shadow threads and synchronization objects known to the first system, while the second system makes the final decision as to whether a thread runs. Separate memory may be allocated to both systems at boot time, or dynamically during their operation. The techniques herein may be used to protect the second system from actions arising in the first system. Preferably, the interaction between the first and second systems is facilitated by a security monitor, which assists in protecting the second system from the first.

36 Claims, 14 Drawing Sheets

OTHER PUBLICATIONS

Coffing, C.L., "An x86 Protected Mode Virtual Machine Monitor for the MIT Exokernel", *Department of Electrical Engineering and Computer Science*, May 21, 1999, 1-109.

Goldberg, R.P., "Survey of Virtual Machine Research", *Computer*, Honeywell Information Systems and Harvard University, 34-45.

Popek, G.J. et al., "Formal Requirements for Virtualizable Third Generation Architectures", *Communications of the ACM*, 1974, 17(7), 412-421.

Smith, J.E., "An Overview of Virtual Machine Architectures", Oct. 27, 2001, 1-20.

Sugerman, J. et al., "Virtualizing I/O Devices on VMware Workstation's Hosted Virtual Machine Monitor", *Proceedings of the 2001 USENIX Annual Technical Conference*, 2001, 1-14.

Wheeler, D.M., "Java Security for a Java Server in a Hostile Environment", *Computer Security Applications Conference*, 2001, 64-73.

Waldspurger, C.A., "Memory Resource Management in VMware ESX Server", *Proceedings of the 5$^{th}$ Symposium on Operating Systems Design and Implementation*, Dec. 9-11, 2002, 15 pages.

* cited by examiner

SYSTEM FOR ISOLATING FIRST COMPUTING ENVIRONMENT FROM SECOND EXECUTION ENVIRONMENT WHILE SHARING RESOURCES BY COPYING DATA FROM FIRST PORTION TO SECOND PORTION OF MEMORY

FIELD OF THE INVENTION

The present invention relates generally to the field of computer security. More particularly, the invention relates to the use of plural execution environments (e.g., operating systems) on a single computing device, and provides techniques that support the cooperation and coexistence of such operating systems or environments.

BACKGROUND OF THE INVENTION

The first computers were only able to run a single program at a time. In modern times, however, computers are expected to be able to run several different pieces of software at once. For example, typical multi-tasking operating systems, such as the MICROSOFT WINDOWS family of operating systems, can run several application programs at once on a single machine. A virtual machine monitor (VMM) is to an operating system what a multi-tasking operating system is to an application program: a VMM allows several operating systems to run at once on a single machine.

A VMM enables plural operating systems to run on a single machine by "virtializing" the entire machine. Conventionally, an operating system controls the use of the physical hardware resources of a machine (e.g., the memory, the processor, etc.), and thus the actual hardware of the machine is exposed to the operating system. When a VMM is used, however, the machine's hardware (e.g., devices) are only exposed to the VMM. The VMM, then, exposes "virtual" machine components to the operating systems. The operating systems control the virtual components exposed by the VMM, and the VMM, in turn, controls the actual hardware.

When plural operating systems are running under a VMM, the VMM's design effectively isolates each operating system from every other operating system. Since each operating system interacts only with the unique set of virtual machine components exposed to it by the VMM, none of the operating systems can interact directly with any of the other operating systems. In effect, when plural operating systems run under a VMM, every operating system is completely protected from the actions of every other operating system.

A VMM is useful when it is desired to completely isolate every operating system from every other operating system. However, the design of a VMM has at least the following drawbacks: (1) in some cases, it is not desirable to isolate all of the operating systems from each other, since this isolation denies the operating systems the ability to share useful infrastructure; and (2) since a VMM requires full virtualization of the machine and all of its devices (thereby requiring that the VMM provide its own device driver for every possible device), a VMM is not well suited to an open architecture machine in which an almost limitless variety of devices can be added to the machine.

In particular, a VMM is especially unsuited to the case where there is one "main" operating system that controls most processes and devices on a machine, and where it is desired to run a small, limited-purpose operating system along side the main operating system to perform certain limited tasks. One way to make an operating system "small" or "limited-purpose" is to allow the small operating system to borrow certain infrastructure (e.g., the scheduling facility, the memory manager, the device drivers, etc.) from the "main" operating system. However, since a VMM effectively isolates one operating system from another, this sharing of infrastructure is not practical.

Certain techniques allow operating systems to exist side-by-side on the same machine without the use of a virtual machine monitor. One such technique is to have one operating system act as a "host" for the other operating system. (The operating system that the "host" is hosting is sometimes called a "guest.") In this case, the host operating system provides the guest with resources such as memory and processor time. Another such technique is the use of an "exokernel." An exokernel manages certain devices (e.g., the processor and the memory), and also manages certain types of interaction between the operating systems, although an exokernel—unlike a VMM—does not virtualize the entire machine. Even when an exokernel is used, it may be the case that one operating system (e.g., the "main" operating system) provides much of the infrastructure for the other, in which case the main operating system can still be referred to as the "host," and the smaller operating system as the "guest." Both the hosting model and the exokernel model allow useful types of interaction between operating systems that support sharing of infrastructure.

However, even when sharing of infrastructure is desirable, there is a particular type of limited-purpose operating system that presents a challenge when infrastructure is being shared: the "high-assurance" operating system, which will be referred to herein as a "nexus." A "high assurance" operating system is one that provides a certain level of assurance as to its behavior. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory. Since the expectation that the nexus will behave according to its specification may be higher than the expectations imposed on the main operating system, the nexus should not interact with the main operating system in any way that would allow events happening at the main operating system to compromise the behavior of the nexus. In this sense, a problem is how to allow different operating systems to interact usefully in a way that supports the sharing of infrastructure, without allowing one operating system to compromise the behavior of another.

While the foregoing describes the problem of allowing operating systems to interact with each other, it will be appreciated that an operating system is merely one type of environment that may need to interact with other environments (or need to be isolated from other environments) to a greater or lesser degree. In greater generality, the problem can be viewed as how two entities can interact with each other when at least one of the entities is, in some respect, distrustful of the actions of another entity.

In view of the foregoing there is a need for a system that overcomes the drawbacks of the prior art.

SUMMARY OF THE INVENTION

The present invention provides mechanisms that allow two computing environments to interact with each other on a single machine, while preventing events at one of the environments from undermining the ability of another to behave as its is expected to behave. As described below, two or more operating systems that run on a single machine are examples of "environments" that may need to interact with each other on a single machine, although it will be understood that the invention is not limited to a traditional operating system. Moreover, at least some of the techniques described herein can be used, in the general case, to protect any type of executable entity (e.g., any piece of software) from any other type of entity.

In the case where two entities exist side by side on a single machine and need to interact with each other, the interaction may take various forms. For example, the two entities may need to communicate data back and forth to each other. In the case where the entities are operating systems (or certain other types of execution environments, such as script engines that execute scripts on a virtual machine), the entities may need to interact with each other in certain other ways—e.g., sharing memory, sharing time on a processor, sharing resources, and handling interrupts. The invention provides techniques whereby two entities can engage in these types of interactions with each other, while allowing one entity to protect itself from certain types of damage that could be caused by events originating with the other entity.

One aspect of the invention provides for inter-entity communication in a manner that prevents the sending entity from tampering with the data while the receiving entity is operating on that data. Data provided by the sending entity is placed into a state where it can be read by the receiving entity but cannot be modified by the sending entity. Thus, the receiving entity can perform validation tests on the data (e.g., virus scans, signature checks, etc.) without the concern that the sending entity will modify the data during or after the validation test. This technique guards against the situation in which the receiving entity seeks to protect itself from damaging data by performing a validation test, and the sending entity fools the receiving entity into accepting bad data by changing the data during or subsequent to the performance of the validation test.

Another aspect of the invention provides for the sharing of scheduling facilities between operating systems (or other execution environments that may need to schedule time on a real or virtual processor). Two operating system may both have the ability to dispatch threads for execution on a processor, but only one of the operating systems needs to maintain a scheduler. For example, a host operating system may have a scheduler, and a guest operating system (e.g., a nexus) may lack a scheduler. In this example, the guest causes a "shadow" thread to be created in the host for each of the guest threads. The shadow thread—which can be scheduled by the host the same as any other thread—causes the guest operating system to be activated with a request that the shadow thread's corresponding guest thread be executed. Since certain types of attacks on the guest could be made by scheduling threads that should not run, the guest performs its own test to determine whether conditions are right to run the thread. If conditions are right, then the guest thread is permitted to run as scheduled; otherwise, the guest thread is not run. This technique allows the guest to borrow the functionality of the host's scheduler, while still protecting itself from the incorrect (or even malicious) scheduling of threads.

To the extent that the scheduling of threads may depend on synchronization decisions (e.g., a thread may need to wait for a shared resource), the host and guest can use "shadow" synchronization objects in much the same way as they use "shadow" threads. That is, the host can maintain a shadow synchronization object for each synchronization object maintained by the guest. For example, if a guest thread needs to wait for a semaphore before running, then the corresponding shadow thread in the host can be set to wait for a shadow semaphore. If the host scheduler concludes that the shadow semaphore is available and schedules the shadow thread that is waiting for it, the shadow thread then invokes the guest which can then verify that its own records show that the semaphore is available before allowing the thread to run. This technique allows synchronization objects at the host to be used to make scheduling decisions, while preventing an adversarial host from manipulating the synchronization object to trick the guest into thinking that an awaited-for resource is available when it is not.

Another aspect of the invention concerns sharing of user information that is used to make access control decisions on host or guest resources. The guest operating systems, or the host and the guest may share a user account database. If a process or thread in the guest operating system makes a request that another guest or the host should access a resource on its behalf, then the request should be made in the context of a particular user or machine security account. For example, a guest process belonging to user A should only be able to access a resource (e.g. a file) belonging to user B if the access control information on the resource permits it. To accomplish this, guest processes or threads may have the security context of the shadow process or thread.

Another aspect of the invention allows a guest to use the interrupt service routines of the host in a secure way. Certain types of guests (e.g., a nexus) should not run any of the host's code, including the host's interrupt service routines, because these routines might cause the nexus to behave in an unexpected way that is outside of the guest's behavioral specification. Thus, when an interrupt occurs in the guest, the guest can exit to the host, while indicating what type of interrupt occurred. The host's interrupt service routine for that type of interrupt can then execute normally.

Another aspect of the invention provides for the distribution of memory between operating systems (or other execution environments that use memory). For example, different operating systems may be started at the same time, and each assigned large blocks of memory. Or, memory may be shuttled back and forth between operating systems while the operating systems are running. A record is kept of which operating system the memory is assigned to. Where one of the operating systems is a high assurance operating system, that operating system may require that no other operating system has access to a piece of memory. A trusted entity maintains a record of which pages of memory are assigned to a given operating system, and enforces the assignments of pages.

In one embodiment of the invention, the two entities are a host operating system and a guest operating system, where the guest operating system is a high-assurance operating system such as a "nexus." There may also be a security monitor that manages interaction between the host and guest operating systems. In the case where there is a security monitor, the security monitor may have many of the same needs as the guest operating system—i.e., it may need to engage in protected communications with the host and guest operating systems, it may need memory, it may have threads that need to be scheduled by the host operating system. The security monitor may use any of the techniques described herein.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

When two operating systems run side-by-side on a single machine, they may need to engage in certain types of interaction with each other. Moreover, one of the operating systems may need to be protected from damage that could be done as a result of events originating at the other operating system. The present invention provides techniques that support the interaction of operating systems (or other entities), while affording such protection.

Exemplary Computing Arrangement

Figure 1:
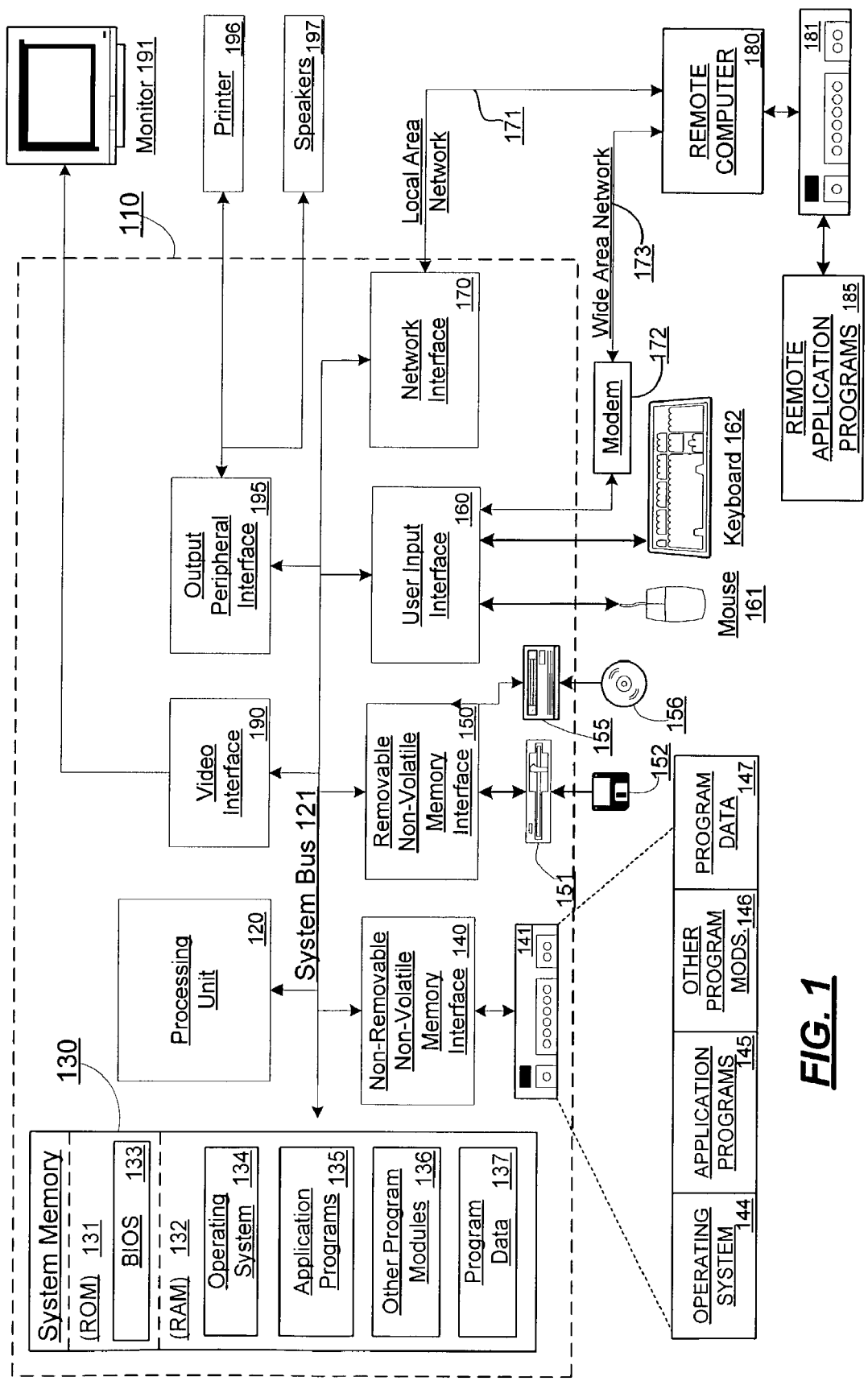
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Computing Environments on a Single Machine

As previously described, it is known in the art that two operating systems can execute side-by-side on a single computing device. One problem that the present invention can be used to address is how to provided some level of separation between two operating system, while still providing for some level of interaction between the two operating systems.

Figure 2:
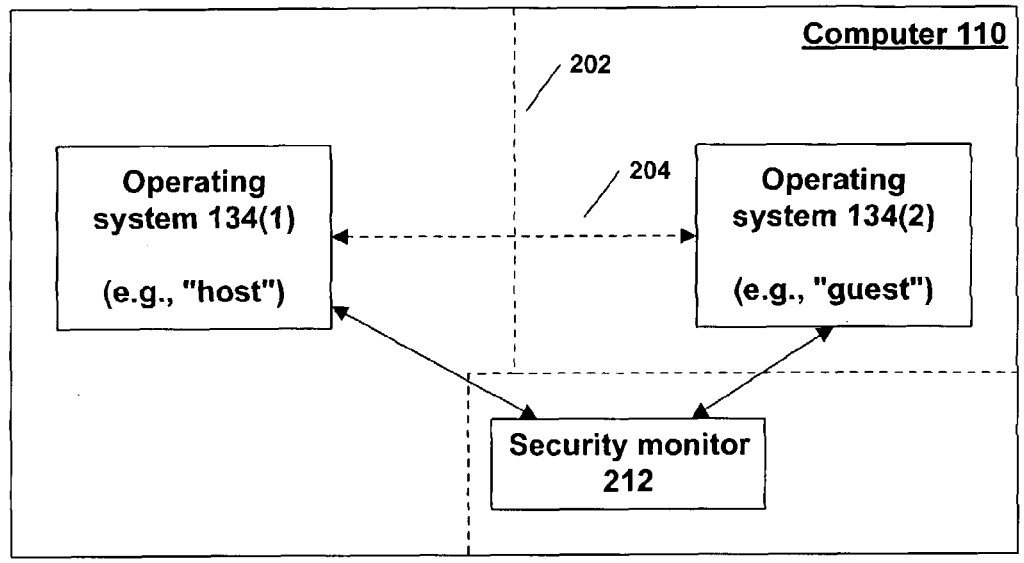
FIG. 2 is a block diagram two exemplary execution environments that maintain some interaction with each other and some separation from each other.

FIG. 2 shows a system in which two operating systems 134(1) and 134(2) execute on a single computer 110. Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system. In the example of FIG. 2, operating system 134(1) is a host operating system, and operating system 134(2) is a guest operating system, such as a "nexus" as described above. As previously noted, when operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where operating system 134(2)

is a nexus.) Mechanisms are disclosed herein that allow separation 202 to be constructed so as to allow for this balance of interaction and protection.

The separation 202 between operating systems 134(1) and 134(2) may, optionally, be enforced with the aid of security monitor 212. Security monitor 212 is a component external to both operating systems 134(1) and 134(2), which provides some security services that may be used to protect operating system 134(2) from operating system 134(1). For example, security monitor 212 may control access to certain hardware, may manage the use of memory (to give operating system 134(2) exclusive use of some portions of memory), or may facilitate the communication of data from operating system 134(1) to operating system 134(2) in a secure way. It should be noted that the use of security monitor 212 represents one model of how operating system 134(2) can be protected from operating system 134(1), although the use of a security monitor is not required. As another example, operating system 134(2) could include all of the functionality necessary to protect itself from operating system 134(1).

Where security monitor 212 is used, the security monitor is able to communicate with both operating systems 134(1) and 134(2). However, inasmuch as the security of operating system 134(2) relies on security monitor 212 behaving correctly, separation 202 protects security monitor 212, as well as operating system 134(2), from operating system 134(1). (Security monitor is shown as being partially on operating system 134(1)'s "side," however, because it may also provide some services to operating system 134(1), while not granting operating system 134(1) the same privileges as are granted to operating system 134(2).)

Figure 3:
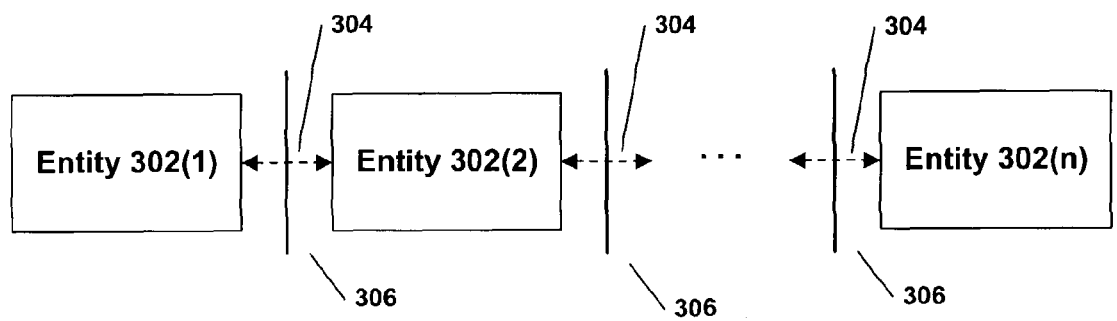
FIG. 3 is a block diagram of plural entities that maintain some interaction with each other and some separation from each other.
Figure 4:
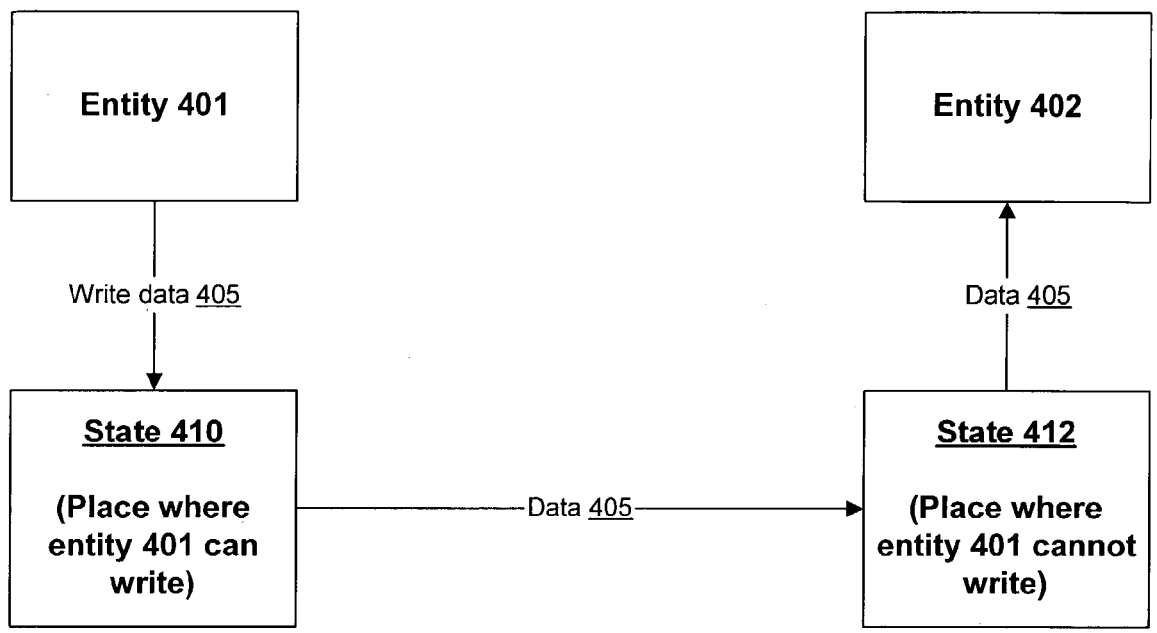
FIG. 4 is a block diagram of an exemplary environment in which data may be communicated from a first entity to a second entity.

It should be noted that FIG. 2 shows operating system 134(1) as a "host" and operating system 134(2) as a "guest." In general, this characterization refers to the fact that, in these examples, operating system 134(1) provides certain operating system infrastructure that is used by both operating systems 134(1) and 134(2) (e.g., device drivers, scheduling, etc.), and operating system 134(2) is a "guest" in the sense that it preferably lacks this infrastructure but rather uses the infrastructure of operating system 134(1). However, it should be noted that the parameters of what makes an operating system a "host" or a "guest" are flexible. Moreover, it should be noted that traditional concepts of "host" and "guest" operating systems presume that the host needs to protect itself from actions of the guest. In the examples of FIGS. 2-4, however, guest operating system 134(2) is presumed to be a high-assurance operating system that needs to protect itself from host operating system 134(1). In the examples that follow, we shall generally refer to operating system 134(1) as the "host" and operating system 134(2) as the "guest" for the purpose of distinguishing between them. It should be appreciated that the techniques described herein can be applied to the interaction of any two or more operating systems running on the same machine (or even on the same set of connected machines).

Finally, it should be noted that while the techniques described herein may be particularly useful in facilitating interaction between two operating systems, many of these techniques are not so limited. For example, there may be execution environments that are not traditionally viewed as operating systems (e.g., script engines that run interpretable scripts on virtual machines) that may benefit from the type of protected interaction that the techniques disclosed below can provide. Moreover, in greater generality some of the techniques can be applied to the broader problem of how different executable entities of any type (e.g., different application processes) can interact with each other while maintaining a level of separation from each other. This greater generality is shown in FIG. 3, wherein entities 304(1), 304(2), . . . , 304(n)—each of which is some type of executable entity—all execute in some type of connected environment, and maintain some level of separation 306 between themselves, while still engaging in some type of limited, protected interaction 304 between each other.

Inter-Environment Communication

The present invention provides for one entity to receive data from another entity with the assurance that the received data cannot be modified by the sending entity. The "entities" that send and receive data may, for example, be different operating systems running on a common computing device, as depicted in FIG. 2, although it will be understood that the invention is not limited to the case where the entities that send and receive data are operating systems.

Referring now to FIG. 4, entity 401 wishes to send data 405 to entity 402. Entity 401 places data 405 into a data storage state 410. State 410 is a region of storage that entity 401 is able to write. After data 405 has been written into state 410, data 405 is placed in data storage state 412. State 412 is a region of storage that is not writeable by entity 401, but that is readable by entity 402. Thus, state 412 contains data 405 in such a manner that entity 402 can access data 405 with assurance that data 405 will not be modified by entity 401. Preferably, state 412 is totally inaccessible to entity 401, since the operations that entity 402 is performing on data contained in state 412 may be secret information that entity 402 does not wish to share with entity 401. However, it is not required that state 412 be totally inaccessible to entity 401, but merely that state 412 be unwriteable by entity 402.

It should be noted that placing data 405 into state 412 may comprise copying data 405 from one physical location to another, although some techniques do not require any copying. As discussed below, it is possible to leave data 405 in the original physical location into which entity 401 has written that data by subsequently removing entity 401's ability to write to that location. In effect, a single storage location would start out as state 410 and would later become state 412. The examples below show various techniques by which data in state 410 can be placed in state 412, some of which comprise copying data from one location to another, and some of which do not.

Figure 5:
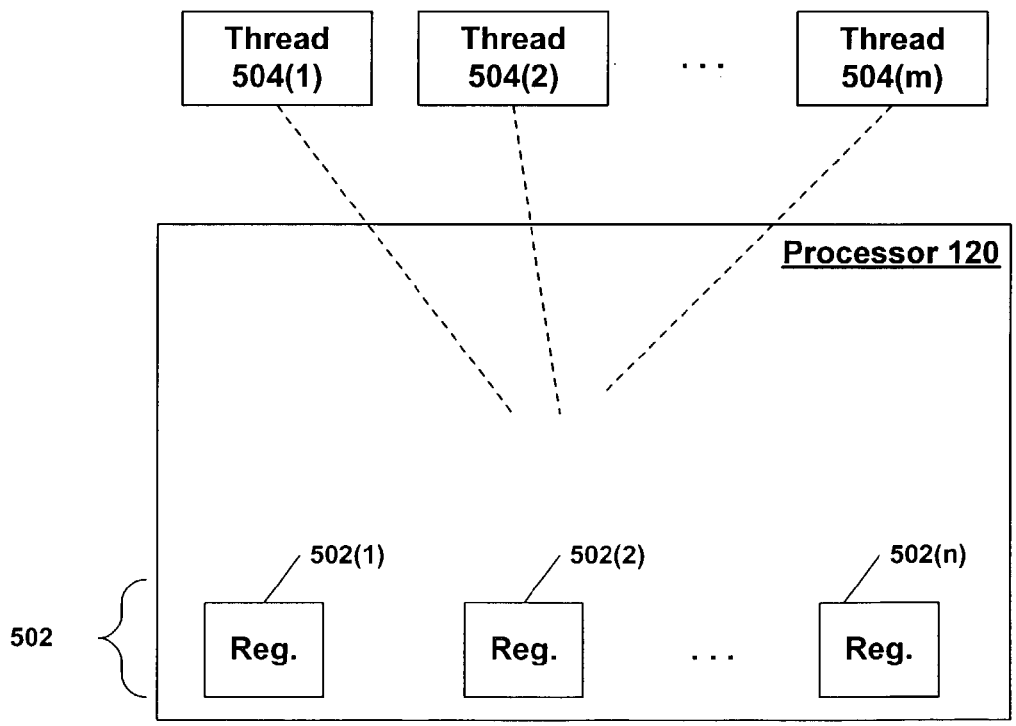
FIG. 5 is a block diagram of a first exemplary arrangement in which data may be communicated from a first entity to a second entity.
Figure 12:
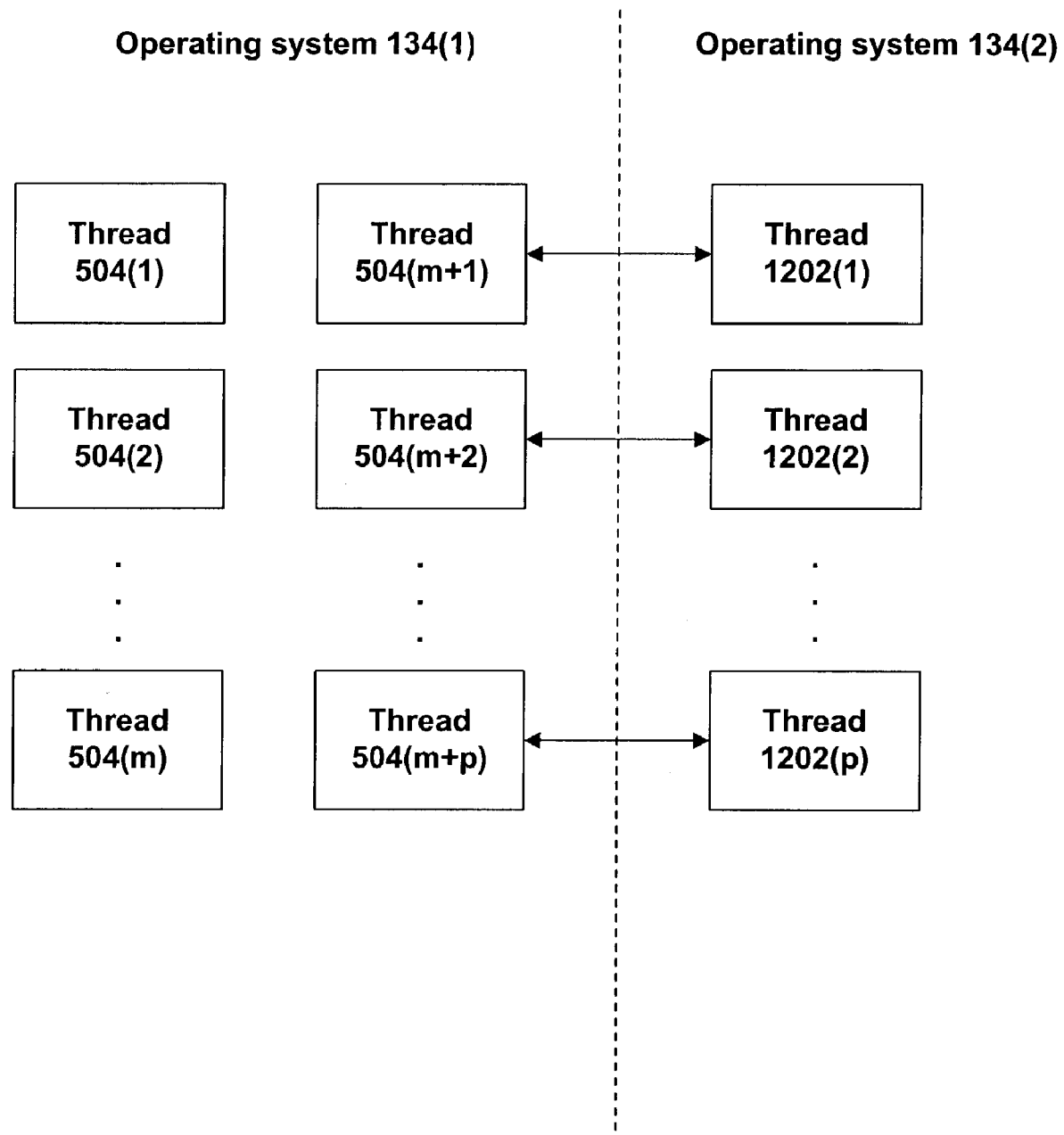
FIG. 12 is a block diagram of first and second exemplary execution environments, where each thread in the second exemplary execution environment has a corresponding shadow thread in the first exemplary execution environment.

FIG. 5 shows an example in which the communication of data between entity 401 and 402 takes place through a set of processor registers 502. In the example of FIG. 12, processing unit 120 includes registers 502(1), 502(2), . . . 502(n). Any one of a plurality of threads 504(1), 504(2), . . . 504(m) can be dispatched to execute on processing unit 120. However, each logical processing unit can only execute one of the threads at a time, and, since access to the contents of registers 502 requires execution of instructions, only the thread that is presently executing can access the contents of the registers. Thus, data can be exchanged between entity 401 and entity 402 through the registers by having a thread of entity 401 run on processing unit 120 and fill one or more of registers 502 with data to be sent to entity 402. A thread of entity 402 can then be dispatched to execute on processing unit 120, and this thread can read the contents of the registers. Since only the executing thread can access the registers, entity 402's thread can be assured that it is reading the contents of the registers without the possibility that entity 401 is modifying those registers. It should be noted that FIG. 12 is an example where the same physical storage is used for both state 410 and 412—i.e., when entity 401's thread is executing on processing unit 120 to write registers 502, then registers 502 are state 410. When entity 402's thread is executing on processing unit 120 to read registers 502, then registers 502 become state 412.

In the case where there is a security monitor 212, and where entities 401 and 402 are two operating systems (e.g., operating systems 134(1) and 134(2), shown in FIG. 2), the example of FIG. 5 may be implemented by allowing each of the operating systems 134(1) and 134(2) to trap into security monitor 212. That is, after the sending operating system 134(1) has filled registers 502 with data to be sent, it raises an exception that informs security monitor 212 that operating system 134(1) has filled registers 502, and that operating system 134(2) needs to begin executing in order to retrieve the contents of those registers. Security monitor 212 then causes operating system 134(2) to execute. It is presumed that this procedure can be performed in a manner that preserves register state, so that the data written by operating system 134(2) will be available for operating system 134(2). In the case in which the security monitor and the guest are a single unit, the transfer of control will be directly from the host to the guest operating system (no intermediate step is required), but it remains the case that only the host or the guest can access the register contents at one time, and the host or guest can programmatically, or possibly as a consequence of external actions (e.g. a device access), transfer control and data between the entities.

Figure 6:
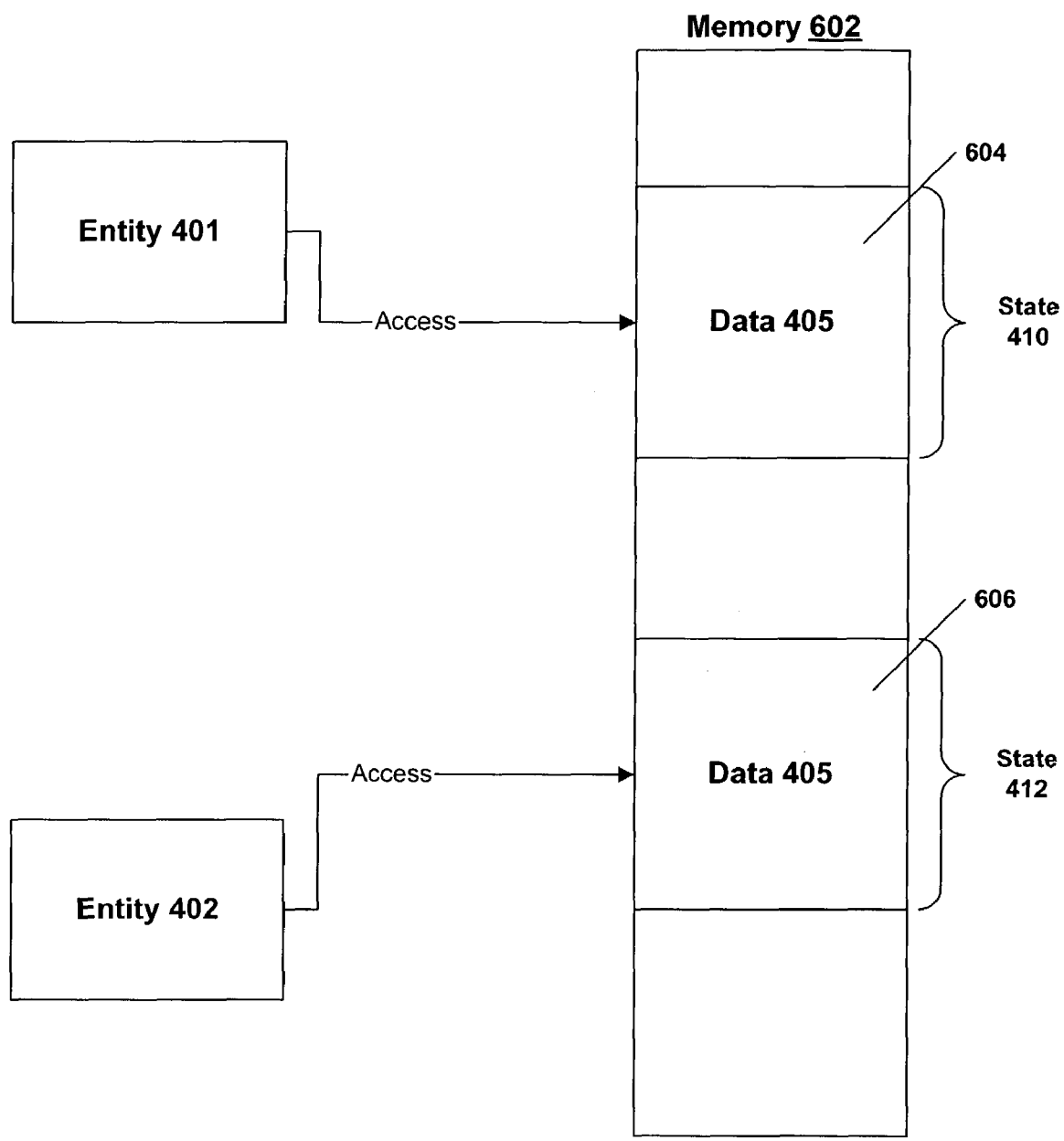
FIG. 6 is a block diagram of a second exemplary arrangement in which data may be communicated from a first entity to a second entity.

FIG. 6 shows an example in which communication from entity 401 to entity 402 is performed by copying data 405 from one portion of memory to another. Entities 401 and 402 have access to memory 602. Where entities 401 and 402 execute on a computer such as computer 110 (shown in FIG. 1), memory 602 may comprise RAM 132. While both of entities 401 and 402 have access to memory 602, each entity's access can be limited to a portion of memory 602. Thus, entity 401 has access to memory portion 604, but does not have access to memory portion 606. Additionally, entity 402 does have access to memory portion 606. Typically, entity 401 will have exclusive read/write access to memory portion 604, and entity 402 will have exclusive read/write access to memory portion 606, although these conditions are not required. It is possible to implement the example of FIG. 6 as long as: (1) entity 401 has write access to memory portion 604; (2) entity 402 has read access to memory portion 606; and (3) entity 401 does not have write access to memory portion 606. When these conditions are met, memory portions 604 and 606 serve as the states 410 and 412, as defined above.

In order for entity 401 to send data 405 to entity 402, entity 401 writes data 405 into memory portion 604 (state 410). Data 405 is then copied into memory portion 606 (state 412). Entity 402 then consumes data 405 contained in memory portion 606 (state 412), and can do so with assurance that the data will not be modified by entity 401, since memory portion 606 (state 412) is not writeable by entity 401. It should be noted that FIG. 6 depicts an example in which placing data 405 into state 412 comprises the copying or transfer of data from one area of storage to another.

There are various scenarios in which the copying of data 405 from memory portion 604 to memory portion 606 can be carried out. For example, in the case where entities 401 and 402 are two operating systems 134(1) and 134(2), respectively, and where security monitor 212 which may have access to all memory (shown in FIG. 2) is being used, security monitor 212 can copy data 405 from memory portion 604 to memory portion 606. As another example, security monitor can copy data 405 from memory portion 604 into an intermediate buffer (e.g., a buffer that is accessible only to security monitor 212), and then from the buffer into memory portion 606. These scenarios assume that security monitor 212 has access to memory portions 604 and 606 and is itself a trusted entity. As another example, in the absence of security monitor 212, entity 402 may be a trusted entity (i.e., trusted by at least entity 401), and entity 402 may function to protect itself from entity 401. In this case, entity 402 may perform the copying of data 405 from memory portion 604 to memory portion 606 or vice versa. But since entity 401 is not trusted by entity 402, the opposite is not the case, i.e., if 402 needs to send data to 401, it should request that 401 copies the data rather than doing it itself.

While FIG. 6 depicts each of memory portions 604 and 606 as being contiguous, contiguity is not required. For example, in a typical virtual memory system based on paging or segmentation, memory portion 604 may represent pages or segments that are mapped to entity 401, and memory portion 606 may represent pages or segments that are mapped to entity 402. These pages or segments can be scattered throughout memory 602, and need not be contiguous as depicted in FIG. 6.

It should be noted that the example of FIG. 6 assumes that there is some mechanism by which portions of memory 602 can be made accessible to some entities and inaccessible to others, but the invention is not limited to any particular mechanism. One example of such a mechanism is in the case of systems that require all memory access to be specified by a virtual address, such as the INTEL x86 class of processors. In such a case, each entity can be assigned its own page map that specifies which virtual address corresponds to a given physical location within memory 602. In this case, a portion of memory can be made accessible to an entity by ensuring that the entity's page map maps some set of virtual addresses to that portion of memory. Conversely, a portion of memory can be made inaccessible to an entity by ensuring that the entity's page map does not map any virtual address to that portion of memory. Moreover, a page map can designate a given page as read/write or read-only, so even a page that is mapped to some virtual address can be made unwriteable by marking the page as read-only. Alternatively, a page that appears in a page map can be made inaccessible by marking the page as "not present." These are merely some examples of how a portion of memory can be made accessible to (or writeable by) one entity, but inaccessible to (or unwriteable by) another entity.

Figure 7:
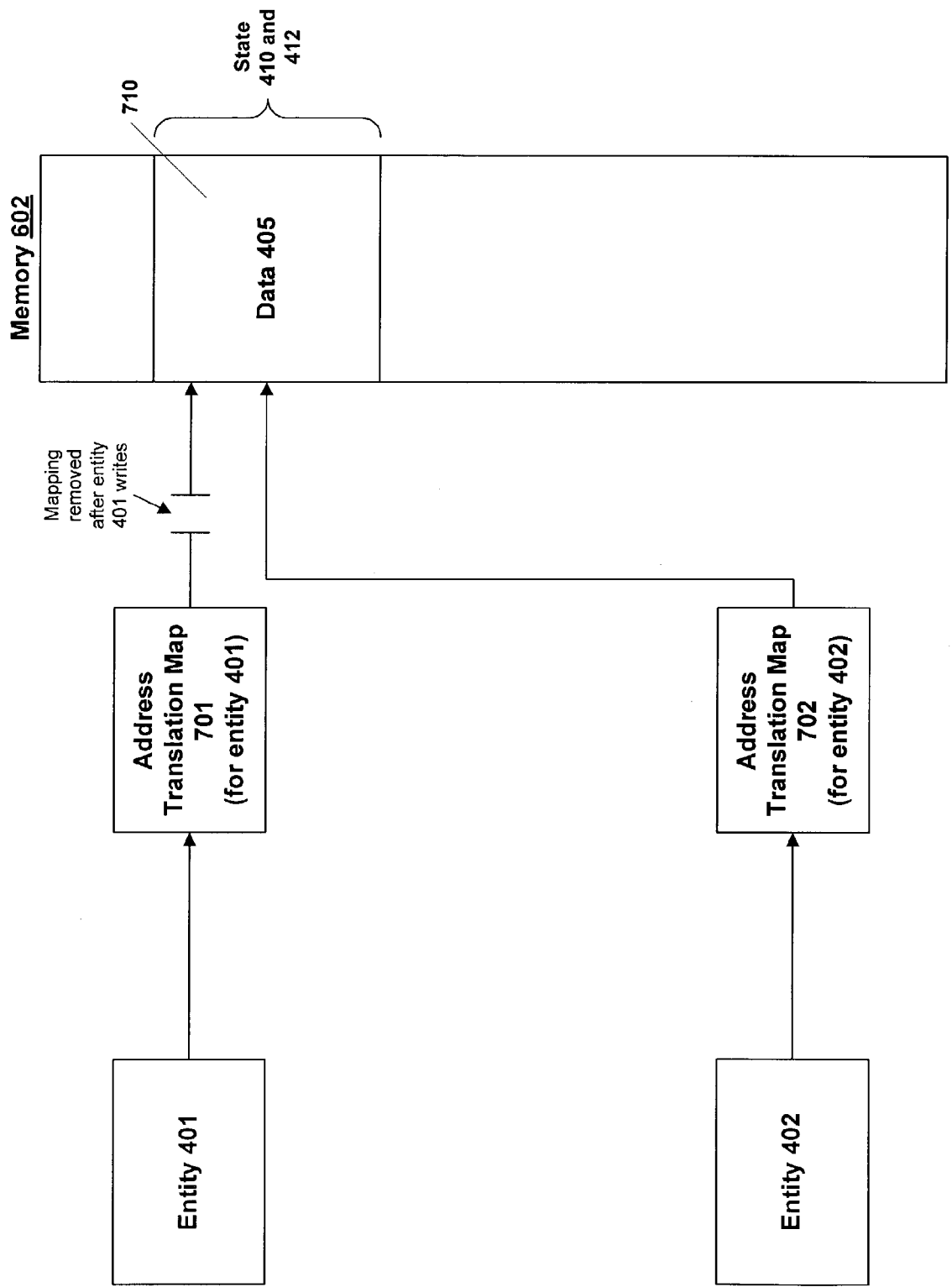
FIG. 7 is a block diagram of a third exemplary arrangement in which data may be communicated from a first entity to a second entity.

FIG. 7 shows an example in which communication from entity 401 to entity 402 is performed by entity 401 writing data into a portion of memory, and then subsequently having that portion of memory "re-mapped" so that it is unwriteable by entity 402. FIG. 7 presumes that entities 401 and 402 exist in some hardware environment that calls for memory to be accessed through a mapping—e.g., the INTEL x86 family of processors, where memory access is generally by virtual address. Thus, the absence of a mapping to a given portion of memory effectively renders that portion of memory inaccessible. (Even if physical addressing is permitted, the technique of FIG. 7 can be used, while using some other mechanism to ensure that physical addresses cannot be used to access some portion of memory.) In the example of FIG. 7, entity 401 is associated with an address translation map 701 (e.g., a page map, a segment table, etc.), that maps some set of virtual addresses to a portion 710 of memory 602. Entity 401 writes data 405 into memory portion 710. After data 405 has been written to memory portion 710, address translation map 701 is modified so that entity 401 can no longer write memory portion 710. In the example of FIG. 7, the modification of address translation map 701 is performed by entirely removing the mapping to memory portion 710 from address translation map 701, so that entity 401 has no virtual address for memory portion 710. However, there are other ways to modify address translation map 701, such as marking the pages (or segments) that make up memory portion 710 as read-only or not present.

Entity 402 is associated with address translation map 702. Address translation map 702 maps some set of virtual addresses to memory portion 710, so that entity 402 can access memory portion 710. Entity 402 uses address translation map 702 to access memory portion 710, and to consume the data 405 contained inside. Since address translation map 701 has been modified so that entity 401 cannot write memory portion 710, entity 402 can consume data 405 with assurance that the data is not being modified by entity 401. It should be noted that the technique depicted in FIG. 7 does not require copying of data 405 from one place to another. In effect, the modification of the address translation map(s) changes memory portion 710 from being state 410 into being state 412.

In one scenario, entities 401 and 402 are operating systems 134(1) and 134(2), respectively, and security monitor 212 controls address translation maps 701 and 702. Thus, security monitor 212 waits for operating system 134(1) to write data 405 into memory portion 710, and then changes address translation map 701 so as to make memory portion 710 unwriteable by operating system 134(1). Additionally, if address translation map 702 does not currently allow operating system 134(2) to read and access memory portion 710, then security monitor 212 changes address translation map 702 to allow such access by operating system 134(2). In another exemplary scenario, there is no security monitor 212, and entity 402 is a trusted entity (trusted, at least, by entity 401, so that entity 402 can change entity 401's address translation map 701). Thus, the modifications to the address translation maps can be performed by entity 402 instead of by security monitor 212.

Figure 8:
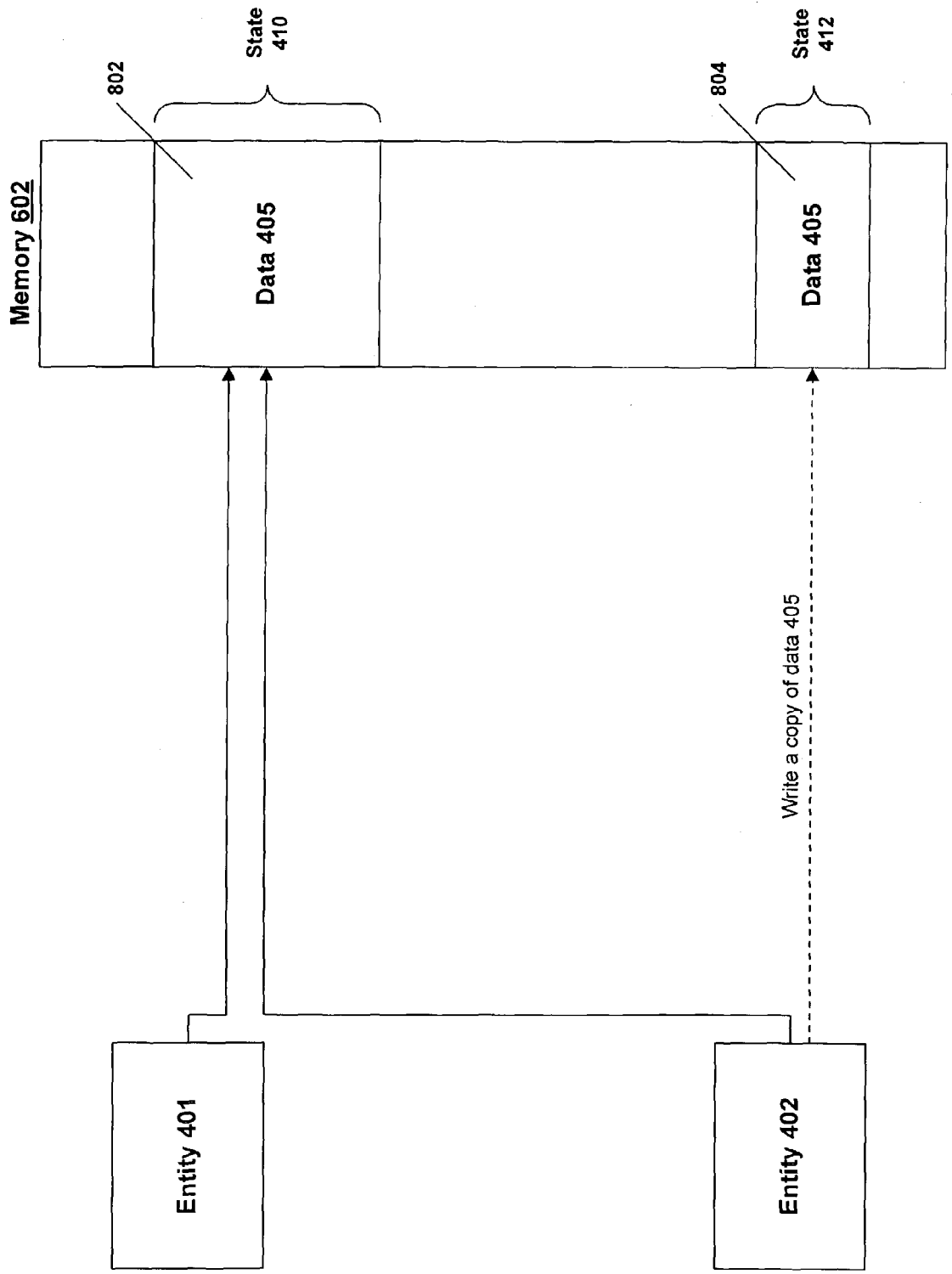
FIG. 8 is a block diagram of a fourth exemplary arrangement in which data may be communicated from a first entity to a second entity.

FIG. 8 shows another example of how entity 401 can communicate data to entity 402. In the example of FIG. 8, entities 401 and 402 have shared access to portion 802 of memory 602. This shared access may allow both of entities 401 and 402 to read and write memory portion 802. Thus, entity 401 writes data 405 into memory portion 802, and entity 402 consumes data 405 from memory portion 802. Since the example of FIG. 8 presumes that memory portion 802 is writeable by entity 401 while data 405 is being consumed by entity 402, memory portion 802 corresponds to state 410, but does not become state 412. In the example of FIG. 8, entity 402 effectively creates its own state 412 by copying data 405 into some memory portion 804 that is not writeable by entity 401. Once the data has been copied into memory portion 804, entity 402 can consume data 405 without concern that entity 401 will modify data 405 while that data is being consumed. In some special cases, it may not be necessary to copy the data before it is processed, or the copying may be piggybacked on some other action. In general, if the consumer of the data processes the data in "one pass" then the a potentially adversarial data source can do no more damage if it is allowed to modify the data after it is being consumed than before (i.e. before it is being sent).

Another special case is if the data passed is encrypted, and the recipient decrypts (and possibly checks the integrity of the data) before further use. Decryption (e.g. a stream cipher) is often single pass, and so the "decrypt" and "copy to a private location" can be performed in a single step, avoiding the expense of an unnecessary copy.

It should be noted that the techniques of FIGS. 5-8 each have their advantages and disadvantages. For example, the technique of FIG. 5 (in which registers are used to communicate data between two entities) may be useful when the amount of data to be communicated is small. However, this technique may be inappropriate for larger communications. The technique of copying data from one place to another (as shown in FIG. 6) may be useful for larger transfers. The technique of changing entity 401's mapping to a single area of memory (as shown in FIG. 7) may be useful for the very largest data transfers; although changing a mapping may be a complex operation, doing so may be faster than copying a large amount of data. In one embodiment of the invention, a decision may be made about which technique to use based on some factor such as the size of the data to be copied.

Figure 9:
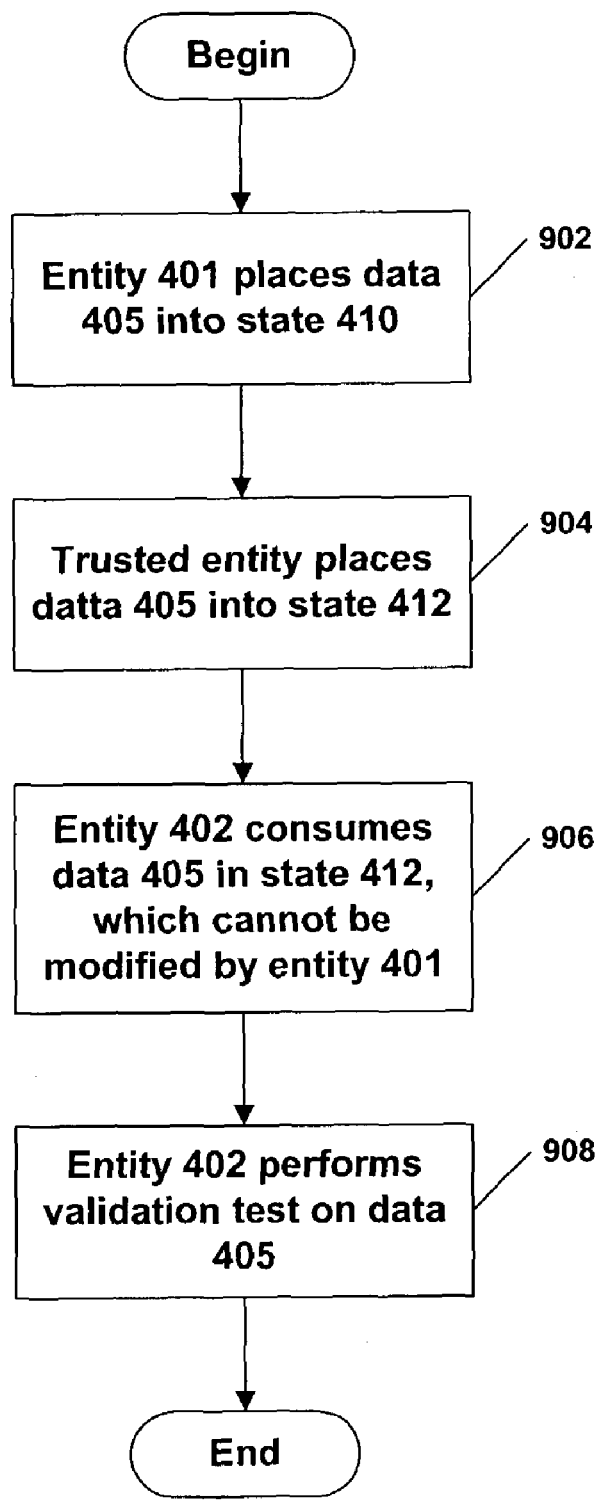
FIG. 9 is a flow diagram of an exemplary process by which data may be communicated from a first entity to a second entity.

FIG. 9 is a flow diagram of a generalized process of communication between two entities. Initially, entity 401 places 902 data 405 into state 410. Next, a trusted entity takes data 405 from state 410 and places 904 that data into state 412. As noted above, the placing of data into state 412 may involve copying the data from one physical location to another, but may also be performed without copying by using the location that constitutes state 410 and changing the attendant circumstances (e.g., the address translation maps in the case of the example of FIG. 7, or the currently executing thread as in the example of FIG. 5, as described above) such that a location that starts out as state 410 becomes state 412. Additionally, there are a variety of "trusted entities" that can place data 405 into state 412. For example, the trusted entity may be external to entities 401 and 402 (as in the case of security monitor 212 that is external to the operating systems 134(1) and 134(2) for which it provides security), or the trusted entity may be one of the entities that participates in the communication (i.e., where there is no external security monitor 212, and entity 402 is the trusted entity).

After data 405 has been placed into state 412, entity 402 consumes 906 data 405 contained in state 412. As described above, entity 401 preferably has no access at all to the data in state 412, but, at a minimum, is unable to modify the data contained in state 412 while that data is being consumed by entity 402.

While operation 906 calls for entity 402 to "consume" data 405, the scope of the invention is not limited to any particular type of consumption. In the simplest case, entity 402's consumption of data 405 comprises merely reading that data. However, in order to protect itself from damaging data, entity 402 preferably (but optionally) performs 908 some type of validation test on data 405. Validation tests could include performing a virus scan, verification of checksums or signatures, or any other type of validation test. The process shown in FIG. 9 is particularly useful for allowing entity 402 to protect itself though a validation test, because entity 402 can be assured that entity 401 is not modifying the data during, or subsequent to, the validation test. Such modification of data 405 during or after a validation test is characteristic of a class of security attack in which one entity (e.g., entity 401) tricks another entity (e.g., entity 402) into believing that the data meets some standard that the data does not, in fact, meet. Ensuring that entity 402 receives data 405 in such a way that the data cannot be modified by entity 401 guards against this type of attack.

Memory Resource Management

A guest operating system (e.g., operating system 134(2)) needs access to hardware resources, and in particular memory. Moreover, when a security monitor 212 is present, then guest operating system 134(2) and security monitor 212 need to cooperate to share memory effectively. There are various scenarios involving the coexistence of host operating system 134(1), guest operating system 134(2), and security monitor 212 that present certain issues involving the management of memory.

In one example, security monitor 212 may "late boot"—i.e., it may initialize at some time after host operating system 134(1) is running, although in other cases security monitor 212 may boot earlier (e.g. before host operating system 134 (1) is started.) In the case where security monitor 212 late boots, then host operating system 134(1) must relinquish physical memory resources for use by security monitor 212 and guest operating system 134(2). This relinquishment can be done at the time that host operating system 134(1) initializes (i.e., before host operating system 134(1) starts, or shortly after startup, host operating system 134(1) reserves memory for security monitor 212 and guest operating system 134(2)). Memory can also be reserved after operating system 134(2) has been running for an extended period. One potentially significant difference between reserving memory at the time host operating system 134(1) starts and reserving memory later is that in systems with page-based virtual memory systems, large contiguous states of unused physical memory can be obtained before or shortly after operating system 134(1) boots. Typically after such an operating system has been running for an extended period, contiguous free memory states are much smaller. Thus, when memory is reserved for guest operating system 134(2) or security monitor 212 after host operating system 134(1) has been running for a period of time, guest operating system 134(2) and security monitor 212 must deal with fragmented physical memory.

To support run-time relinquishment of memory, host operating system 134(1) identifies some memory pages that are not in use (typically by removing them from the "free list" held by the memory manager), and "gives" them to guest operating system 134(2) and/or security monitor 212. In this context, "giving" means "agreeing not to use again until the nexus has agreed to relinquish the memory." Typically, security monitor 212 will prevent host operating system 212(1) from accessing memory that host operating system 134(1) has relinquished. If memory is relinquished by one operating system, then security monitor 212 updates its rules as to which operating system owns the relinquished memory, and the operating system that receives the relinquished memory can add these pages of memory to its free list.

Figure 10:
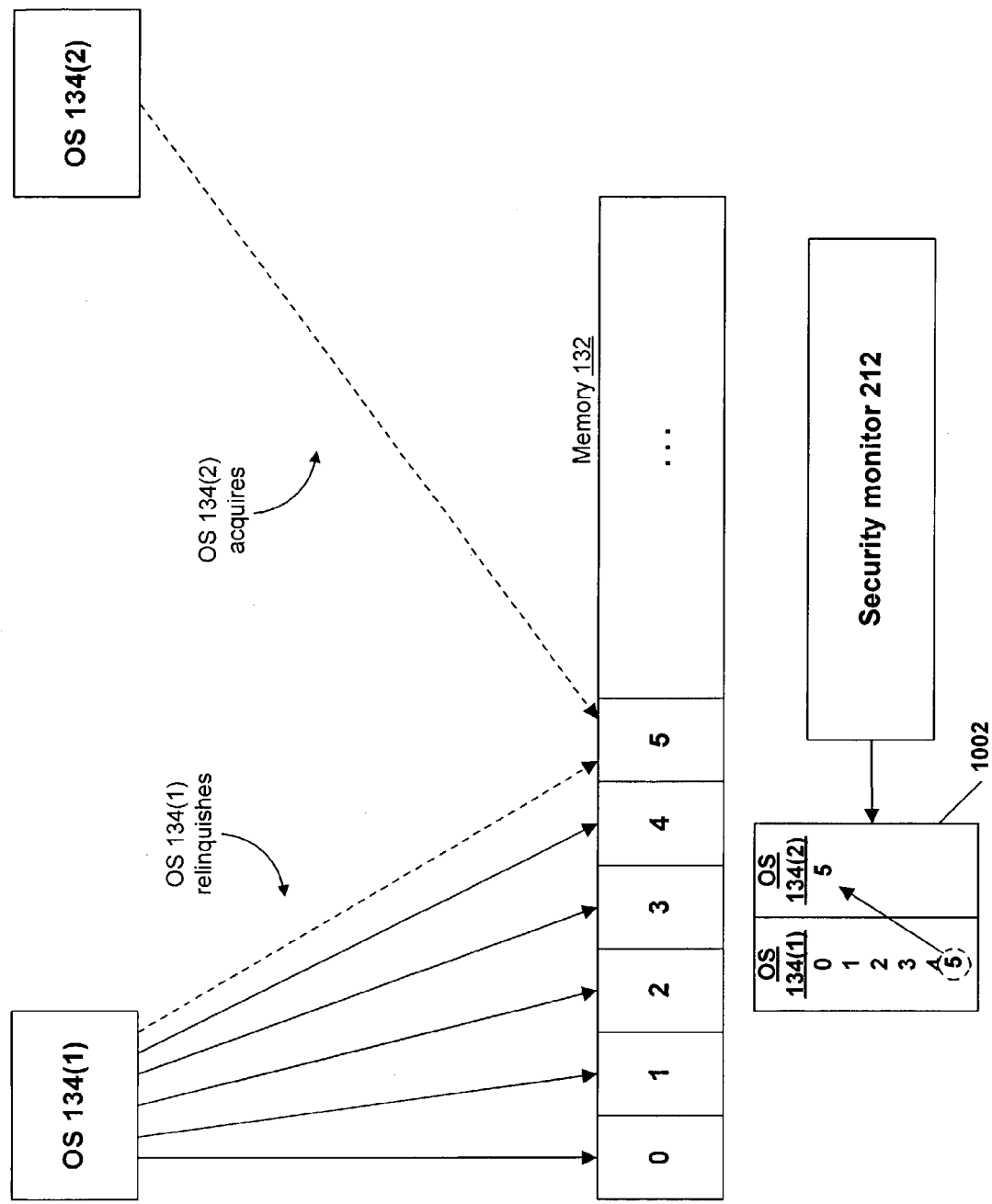
FIG. 10 is a block diagram of an exemplary memory arrangement that supports the sharing of memory between two exemplary execution environments.

FIG. 10 depicts how memory can be reassigned from one operating system to another. Initially, host operating system 134(1) owns pages 0, 1, 2, 3, 4, and 5 of memory (RAM) 132. At some point in time, operating system 134(1) relinquishes a page (e.g., page 5), so that this page may be acquired by guest operating system 134(2). Security monitor maintains a record 1002 of which operating system currently owns which page of memory. Initially, record 1002 shows pages 0-5 as being owned by host operating system 134(1), but, after operating system 134(1) relinquishes page 5, record 1002 is updated to reflect that page 5 is owned by guest operating system 134(2). Record 1002 may also indicate which pages are owned by security monitor 212 itself.

Security monitor 212 or guest operating system 134(2) may need additional memory at runtime. This can be accomplished using mechanisms similar to those described above—i.e., host operating system 134(1) removes pages from its free list and provides them to the security monitor 212 or guest operating system 134(1).

Similarly, if the guest operating system 134(2) or security monitor 212 no longer needs memory—e.g., if a large application is no longer running, or if the nexus is about to close down—it may relinquish pages back to host operating system 134(1). In this case, the nexus no longer uses the relinquished pages, the main OS can use them again (i.e., put them back on the free list), and the monitor updates the memory protection data structures to allow the main us to use the pages again.

To support more dynamic memory allocation, the host and guest may each expose services that allow the other to request more memory, or to relinquish memory back.

If more than one operating system is vying for physical memory, it may be beneficial to provide a "memory balancing" service that looks at the memory load for the host and guest operating systems (and/or security monitor 212), and shuttle memory backwards and forwards to optimize performance. The services described above may be used to allow each operating system to indicate whether it needs memory or has memory to release.

On some platforms each transfer of memory between the host and the guest may incur a constant overhead cost. In such cases, it may be preferable to implement the optimization of moving memory in large blocks (e.g., 1000 pages at a time, rather than 1 page at a time).

Processor Time Management

One function typically performed by an operating system is to schedule threads for execution on a processor. As described above in connection with FIG. 2, the invention allows plural operating systems to run simultaneously on a single computing device. Given that each of these operating systems may have threads that need to be schedule on the computing device's processor(s), one problem that arises is how the different operating systems can all schedule their threads to run on a common processor or set of processors.

According to one aspect of the invention, one operating system can effectively use the scheduler of another operating system. For example, operating system 134(2) can use the scheduler of operating system 134(1) to schedule operating system 134(2)'s threads. One advantage of this design is that there is an inherent complexity in writing two schedulers that can cooperate with each other. By allowing one operating system to schedule threads for another, the complexity of the scheduler is greatly reduced. However, when one operating system (e.g., operating system 134(2)) is a high-assurance ("trusted") component (e.g., a nexus), that operating system cannot give an ordinary untrusted operating system the unregulated power to schedule its threads, since the ability to schedule operating system 134(2)'s threads inappropriately could be used to carry out various types of attacks that could cause operating system 134(2) to violate its behavior expectations. Thus, one aspect of the invention provides a technique whereby operating system 134(1) can schedule operating system 134(2)'s threads, while still allowing operating system 134(2) ultimate control over what threads are permitted to execute.

Figure 11:
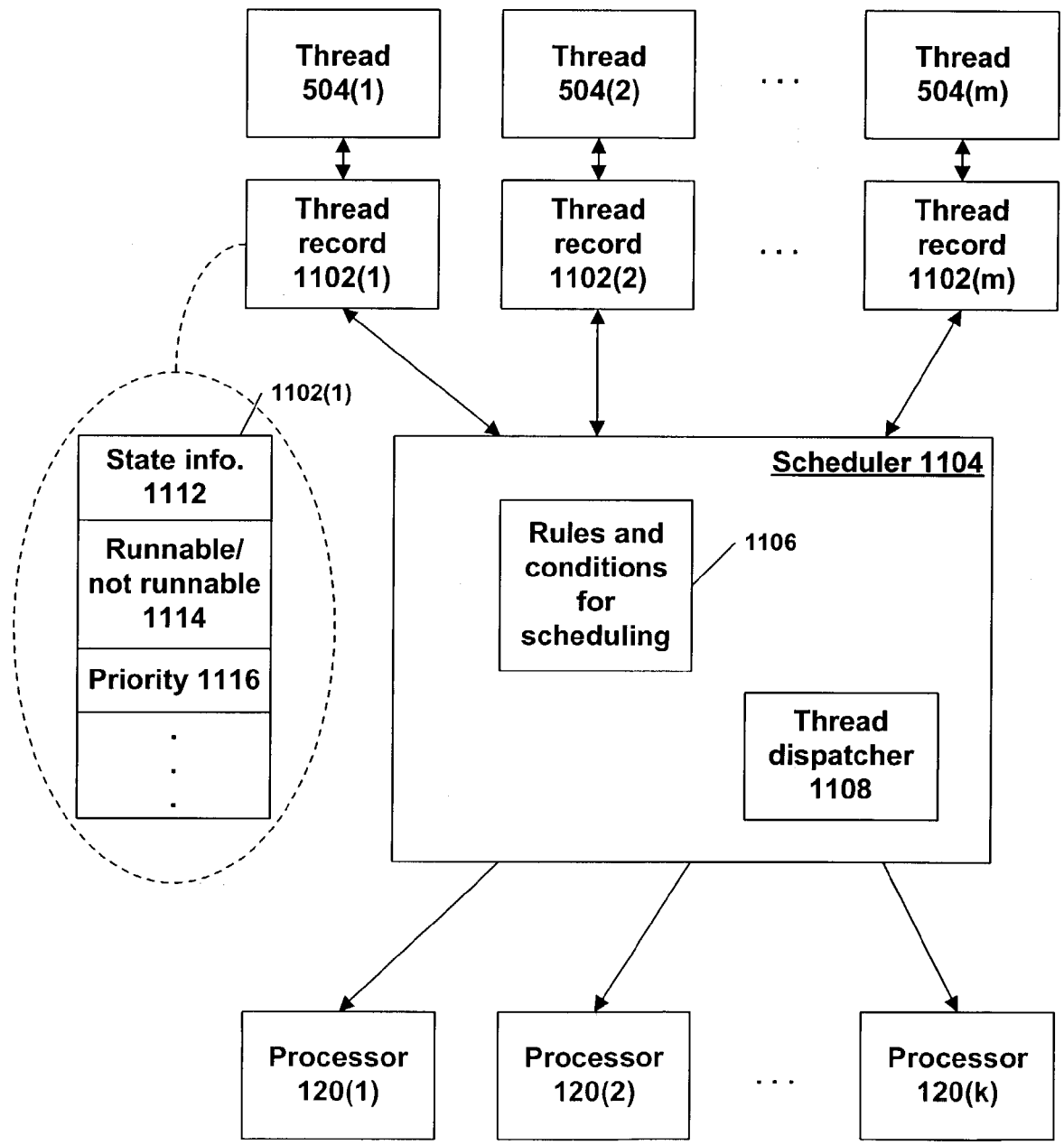
FIG. 11 is a block diagram of an exemplary architecture that schedules and dispatches a plurality of threads.

FIG. 11 shows a basic model of a scheduler. Scheduler 1104 is aware of a plurality of threads 504(1), 504(2), . . . , 504(m) that potentially need to be scheduled for execution on one or more processors 120(1), 120(2), . . . 120(k). Each thread is represented by a thread record 1102(1), 1102 (2), . . . , 1102(m). As shown in FIG. 11, thread record 1102(1) represents thread 504(1), thread record 502(2) represents thread 504(2), and so on. Each thread record contains information about the thread that is used in the process of scheduling and dispatching the thread. For example, thread record 1102(1) includes state information 1112 (e.g., the contents of registers, etc.), an indication 1114 as to whether the thread is runnable or not runnable, the priority 1116 of the thread, and possibly other information. (In some cases, some of this information is stored in places other than the thread records; for example, there may be a separate table of which threads are currently runnable, in which case the thread records themselves do not need to contain this information.)

Scheduler 1104 includes, or is able to access, a set of rules and conditions 1106 for scheduling threads 504(1) through 504(m). For example, rules and conditions 1106 may require that only threads whose indication 1114 is set to "runnable" can be scheduled to run. Another rule may require that a thread be assigned greater or lesser processor time depending on how high the thread's priority 1116 is.

Thread dispatcher 1108 performs the mechanical task of starting a chosen thread running on a given processor. Thus, once scheduler 1104 has selected a thread to run on a particular processor based on rules and conditions 1106, scheduler 1104 uses thread dispatcher 1108 to actually load the thread onto the processor. Thread dispatcher 1108 uses state information 1112 to set the state of the processor in accordance with the requirements of the thread (e.g., loading the registers with their saved contents from the last time the thread executed), and performs various other tasks necessary to start the thread running on a processor. In the simplest cases, scheduler 1104 schedules threads successively to run on a single processor, but in multi-processors systems, scheduler 1104 may schedule plural threads to run on different logical processors at the same time.

A timer recurrently wakes up scheduler 1104 and causes it to remove a thread from a processor and to dispatch a new thread to that processor. When the timer ticks, scheduler 1104 saves the state information (e.g., register contents) for the running thread in that thread's corresponding thread record, and then calls upon thread dispatcher 1108 to dispatch another thread onto the processor.

It will be appreciated that a high assurance component (e.g., operating system 134(2)) whose behavioral specification requires it not to "leak" information outside of itself cannot trust another operating system (e.g., operating system 134(1)) with the task of dispatching a thread, since the act of dispatching the thread would necessarily give the dispatching operating system access to the thread's register contents. Additionally, there are various other types of attacks to an operating system that are based on scheduling threads to run at inappropriate times (e.g., running threads that have been designated as not runnable, or running a thread that is already running on another processor). However, one advantage of the invention is that a high assurance operating system such as operating system 134(2) can be implemented without a full scheduler 1104, as long as it has its own thread dispatcher 1108.

There are various ways that a second operating system can use a first operating systems' scheduler. These ways include:

The first operating system can treat the second operating system as a single schedulable entity. In this scenario, the first operating system's scheduler recurrently schedules the second operating system to run, but otherwise has no control over which individual thread the second operating system chooses to run. When the second operating system is invoked, it dispatches its own threads to execute. In this scenario, the second operating system has its own scheduler, but the second operating system's scheduler only runs when it has been allotted time by the first operating system's scheduler. This arrangement avoids many of the complexities that exist when two operating systems' schedulers need to cooperate in order to schedule time on the same set of processing resources.

The actual threads of the second operating system (or, at least, their individual existence) can be known or represented to, and individually scheduled by, the first operating system. In this example, the first operating system makes all of the complicated decisions about how to schedule the second operating system's threads (e.g., how to account for a thread's priority), but the ultimate dispatch of the second operating system's threads is performed by the second operating system—which can protect itself from an attack by refusing to perform the dispatch if conditions are not appropriate to run the thread. Below, a technique is described whereby one operating system can schedule another operating system's threads.

FIG. 12 shows operating systems 134(1) and 134(2) on the same machine. Operating system 134(1) has a scheduler. Operating system 134(1) owns a plurality of threads 504(1), 504(2), . . . , 504(m). Operating system 134(2) also owns a plurality of threads 1202(1), 1202(2), . . . , 1202(p). For each thread owned by operating system 134(2), a corresponding "shadow" thread is created, where the shadow thread is owned by operating system 134(1). Thus, thread 504(m+1) is the shadow thread for thread 1201(1), thread 504(m+2) is the shadow thread for thread 1202(2), etc., up through thread 504(m+p), which is the shadow thread for thread 1202(p). Each of the shadow threads 504(m+1) through 504(m+p) can be scheduled by operating system 134(1).

Whenever a shadow thread 504(m+1) through 504(m+p) is dispatched, the ultimate effect is to run the corresponding "real" thread 1202(1) through 1202(p). The mechanism by which the "real" thread is invoked is that the shadow thread contains an instruction to change context to operating system 134(2) with a request that the corresponding "real" thread be run. (Threads 1202(1) through 1202(p) are referred to as "real" threads because these are the threads that will actually perform the substantive "real" work that needs to be done in operating system 134(2). The "real" threads are in contrast to the "shadow" threads, whose function is to be schedulable by operating system 134(1)'s scheduler so that they can invoke the "real" threads.)

Figure 13:
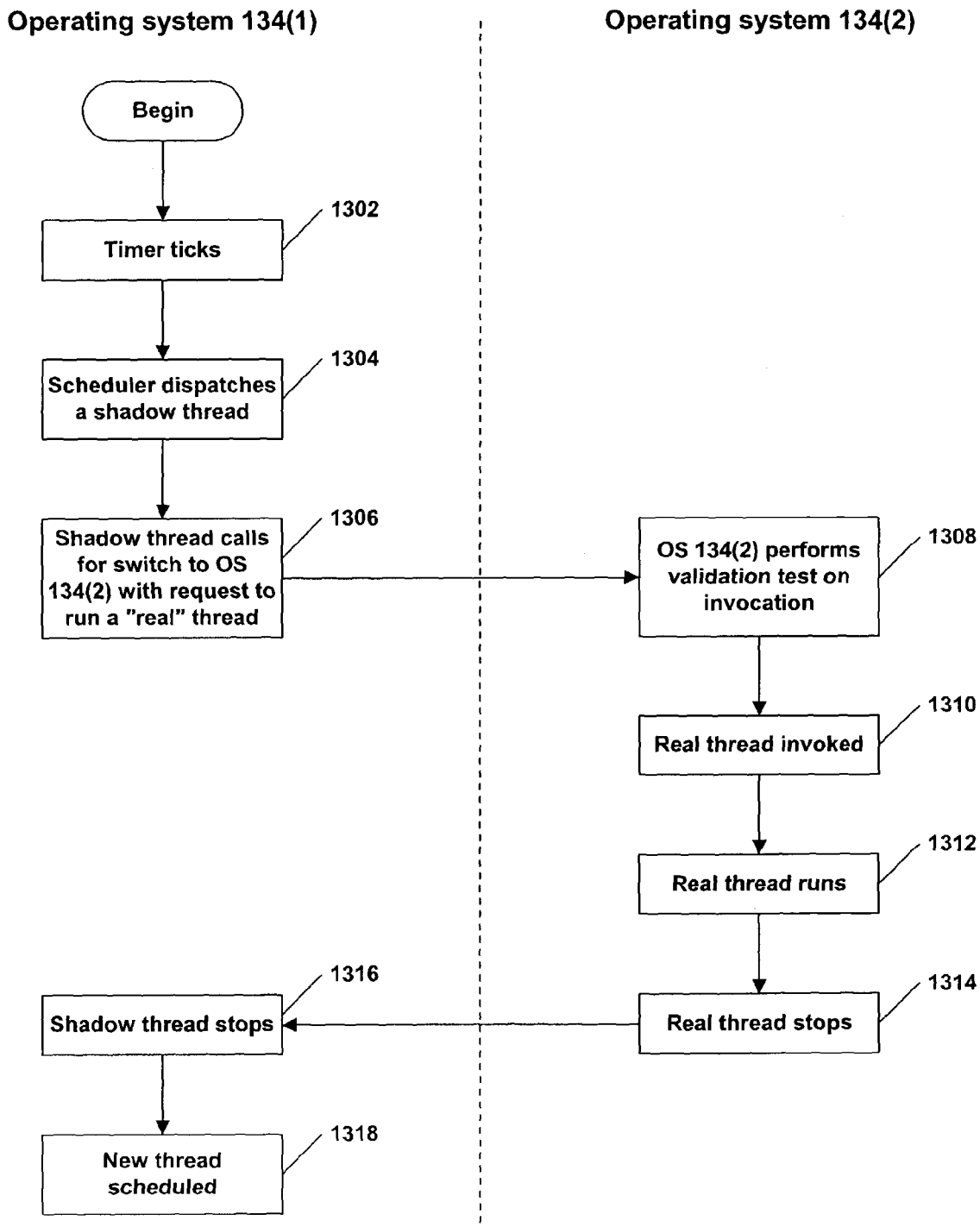
FIG. 13 is a flow diagram of a process of using a shadow thread in a first execution environment to schedule a thread in a second execution environment.

FIG. 13 is a flow diagram of a process by which operating system 134(1)'s scheduler may be used to schedule and invoke operating system 134(2)'s threads. Operating systems 134(1) and 134(2) are generally running on some hardware that supports a timer interrupt. At some point in time, the timer ticks 1302, which wakes up the operating system 134(1)'s scheduler, whereupon the scheduler stops the currently executing thread and dispatches a new thread to the processor 1304. If the scheduler schedules one of operating system 134(1)'s threads (i.e., threads 504(1) through 504(m)), then that thread executes normally under operating system 134(1). However, if the scheduler dispatches 1304 one of the shadow threads (i.e., any of threads 504(m+1) through 504(m+p)), then the shadow thread runs. As noted above, the shadow thread calls for a context switch to operating system 134(2), with instructions that the shadow thread's corresponding "real" thread be invoked. For example, if the scheduler dispatches 1304 shadow thread 504(1), then the shadow thread switches 1306 to operating system 134(2) with a request that "real" thread 1204(1) be invoked.

After the switch to operating system 134(2) takes place, operating system 134(2) performs 1308 a validation test on the request to start a "real" thread. As noted above, operating system 134(2) does not necessarily trust operating system 134(1) to make the final decision about what thread will run, since there are certain types of attacks that can be carried out by running a thread that should not be run. For one embodiment, at step 1308 operating system 134(2) ensures 1308 that operating system 134(1) is not attempting to: (a) start a thread that does not exist, (b) start a thread that is already running (e.g. on another processor), or (c) start a thread that is not designated as "runnable".

Assuming that the attempt to start a thread is determined 1308 to be valid, the thread is invoked 1310. The real thread runs 1312, until some point in time at which the thread stops 1314. The thread may stop either because: (a) a timer tick has interrupted the thread, (b) the thread has terminated, or (c) the thread yields because it needs to wait for another thread or a resource. At the time the "real" thread executing under operating system 134(2) stops, the shadow thread also stops 1316, and control is returned to operating system 134(1).

It should be noted that exactly what happens when the "real" and shadow threads stop (1314 and 1316) depends on the circumstances under which the threads stop. If the "real" thread terminates, then the shadow thread is informed of this fact, and the shadow thread may also choose to terminate.

On the other hand, if the "real" thread yields to wait for another thread or a resource, it can exit while indicating the object in operating system 134(1) that the scheduler should wait for before rescheduling the thread; the shadow thread then exits, with instructions to wait for the object specified by the "real" thread. When the object becomes available, the scheduler can reschedule the shadow thread.

In yet another case, if the real thread is interrupted by a timer tick, then thread should be left in a state in which it is ready to be re-started after the interrupt has been processed, but the timer tick interrupt effectively suspends both the "real" and shadow threads.

After the shadow thread and the "real" thread have been stopped, a new thread may be scheduled (step 1318). The new thread may be either one of the ordinary threads 504(1) through 504(m) belonging to operating system 134(1), or may be one of the shadow threads 504(m+1) through 504(m+p). Operating system 134(1) has no reason to know which of the threads it schedules is an ordinary thread or a shadow thread, and thus its scheduling algorithm does not differentiate between ordinary threads and shadow threads.

It should be noted that the above-described process ensures that the use of operating system 134(1) cannot cause operating system 134(2) to behave in an unintended manner by incorrectly scheduling operating system 134(2)'s threads. However, the above-described process is less effective in protecting against a "denial of service" attack. That is, a user of operating system 134(1) can manipulate the shadow threads such that they are never scheduled. Thus, when operating system 134(2) relies on operating system 134(1)'s scheduler, operating system 134(2) cannot guarantee the rate at which operations are performed, or that it will ever perform any particular action, but it can guarantee that it will not perform any incorrect action resulting from the incorrect or malicious scheduling of its threads.

Figure 14:
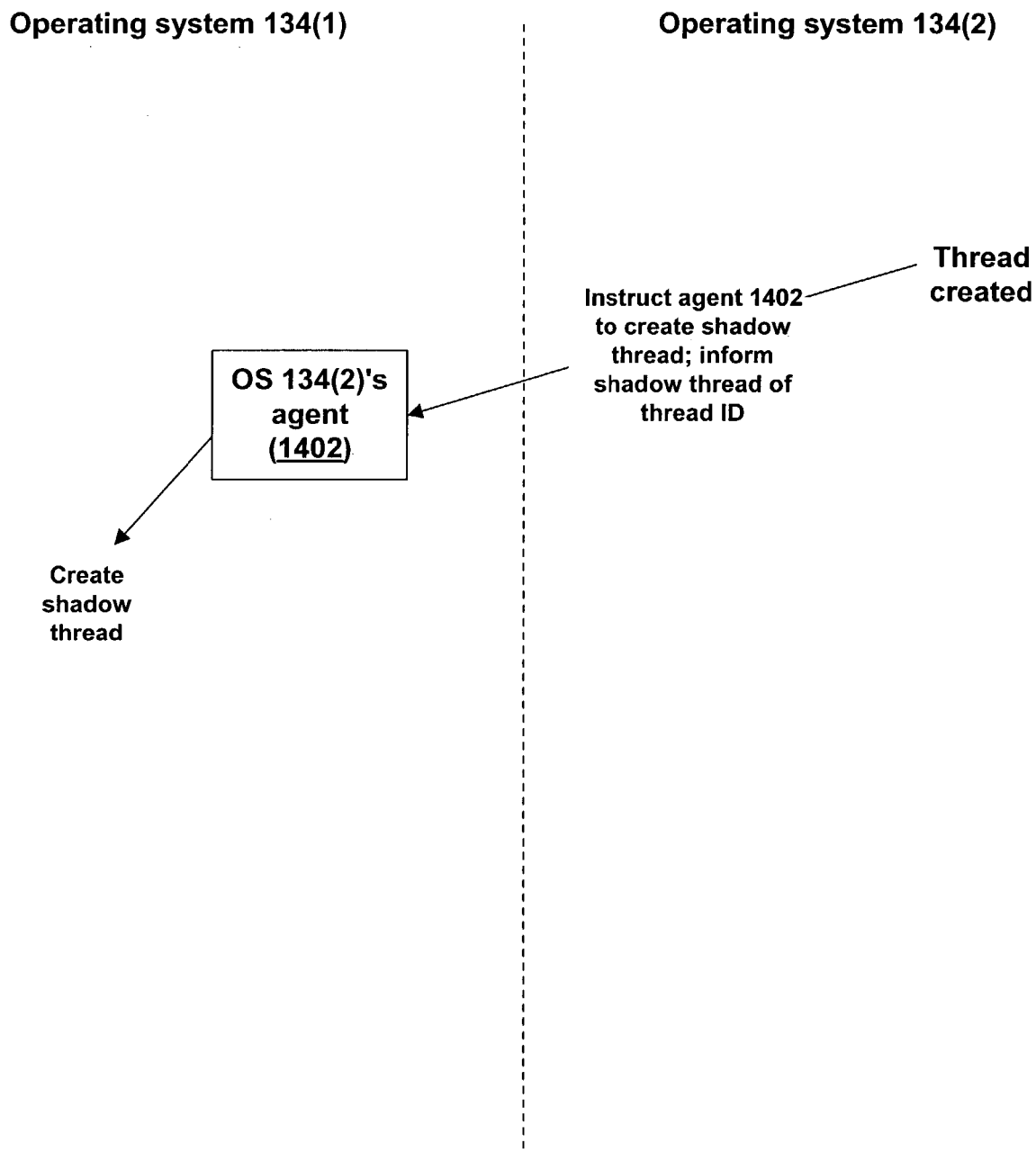
FIG. 14 is a block diagram of an exemplary structure that creates shadow threads in a first execution environment on behalf of a second execution environment.

A mechanism is also provided that allows operating system 134(2) to trigger the creation of shadow threads by operating system 134(1). For one embodiment, shadow threads may be created by an agent of operating system 134 (2) that executes inside of operating system 134(1). FIG. 14 depicts such an agent 1402. Agent 1402 is an ordinary thread or process running under operating system 134(1). Agent 1402 communicates with operating system 134(2)—e.g., using the inter-environment communication techniques discussed above in connection with FIGS. 4-9. When operating system 134(2) creates a thread, it informs agent 1402 that the new thread has been created, and also informs agent 1402 of the new thread's internal thread ID. Agent 1402 then instantiates a shadow thread in operating system 134(1). The shadow thread knows the thread ID that has been communicated to agent 1402. When the shadow thread runs and invokes a context switch back to operating system 134(2), shadow thread uses the thread ID to instruct operating system 134(2) which thread should be started.

Scheduling Enforcement

As discussed above, when operating system 134(2) uses operating system 134(1)'s scheduler, operating system 134 (2) can prevent operating system 134(1) from scheduling threads in a damaging way by performing the tests described above in connection with FIG. 13. In particular, those tests are: (a) does the thread exist, (b) is the thread running, and (c) is the thread runnable. Such checks are sufficient to build a single threaded system—i.e., one in which only one thread at a time can be scheduled. If operating system 134(2) supports more than one thread with access to shared resources, it may be necessary to provide thread synchronization support.

One technique to provide synchronization support for operating system 134(2)'s threads is to use a synchronization object in operating system 134(1)—e.g. a semaphore. This technique, however, may present a security hole for operating system 134(2), since operating system 134(1) can be manipulated to schedule two shadow threads regardless of who is holding the semaphore (or can manipulate the semaphore), thereby causing two threads in operating system 134(2) to execute that should not execute at the same time. If only the tests described above in connection with step 1308 (FIG. 13) are performed, then this incorrect scheduling of two incompatible threads will not be detected. This problem is worse than the denial of service attack described above, in which operating system 134(1) curtails or discontinues scheduling of shadow threads. In a denial of service attack, operating system 134(2) will not perform any actions outside of its behavioral requirements, but may slow down or cease operating. However, if two threads are fooled into thinking that they both have exclusive access to a resource, a program operating under operating system 134(2) may no longer behave correctly. In other words, to the extent that operating system 134(2)'s correctness relies on synchronization, operating system 134(2) should not rely completely on synchronization objects maintained by operating system 134(1), or synchronization decisions made by operating system 134(1).

One way to avoid relying on synchronization objects controlled by operating system 134(1) is to use a synchronization object, such as a spin-lock, that uses operating system 134 (2)'s protected memory, and that is thus inaccessible to operating system 134(1). In this case, the holder of the lock cannot be effected by operating system 134(1). A disadvantage of this technique is that it is inadvisable to use spin locks in situations when the lock can be held for an extended period of time. In such cases, waiting threads are "busy-waiting" i.e. burning processor time waiting for the lock to be released and effecting overall system performance. In such cases, it may be better to use a synchronization primitive that informs the scheduler when a thread is waiting so that other waiting tasks can be performed. However, for reasons of safety, operating system 134(1)'s scheduler should not be used directly—i.e., if operating system 134(1)'s scheduler exposes a synchronization primitive that could be affected by processes under operating system 134(1) itself, then operating system 134 (2)'s behavior should not depend on the correct use of that primitive.

One solution is to create a composite synchronization object consisting of an ordinary host "shadow" synchronization object and an associated private guest object that enforces the correctness of scheduling decisions made by the host OS. Essentially, the "shadow" synchronization object is an ordinary synchronization object maintained by the host (in the same sense that a "shadow" thread, described above, is an ordinary thread), but the guest maintains its own synchronization object that it uses to make the final decision about whether a thread may be run. In short, the host uses its own synchronization objects to decide if and when a thread should be run, but even if a thread is scheduled by the host, the guest makes the final decision based on its own synchronization objects. In more detail, the general behavior of the composite object includes:

(1) If a thread using the private guest object determines that it cannot run, it performs a remote procedure call (RPC) to the host OS to instruct it to wait on the associated shadow synchronization object.

(2) If host-waiting thread is awakened and instructs the guest to run the corresponding real thread. If the real thread still cannot run as determined by the guest synchronization object, it returns to the waiting state on the shadow object.

(3) If a guest thread acts on a guest synchronization object, the corresponding shadow thread modifies data in the host synchronization object so that other threads behave correctly.

(4) If a guest acts on a synchronization object in such a way that threads waiting on shadow synchronization object may be awoken, then the guest thread makes an RPC to awaken any and all waiting shadow threads. In the normal course of affairs, any awoken host threads will perform the actions described in step (2).

Figure 15:
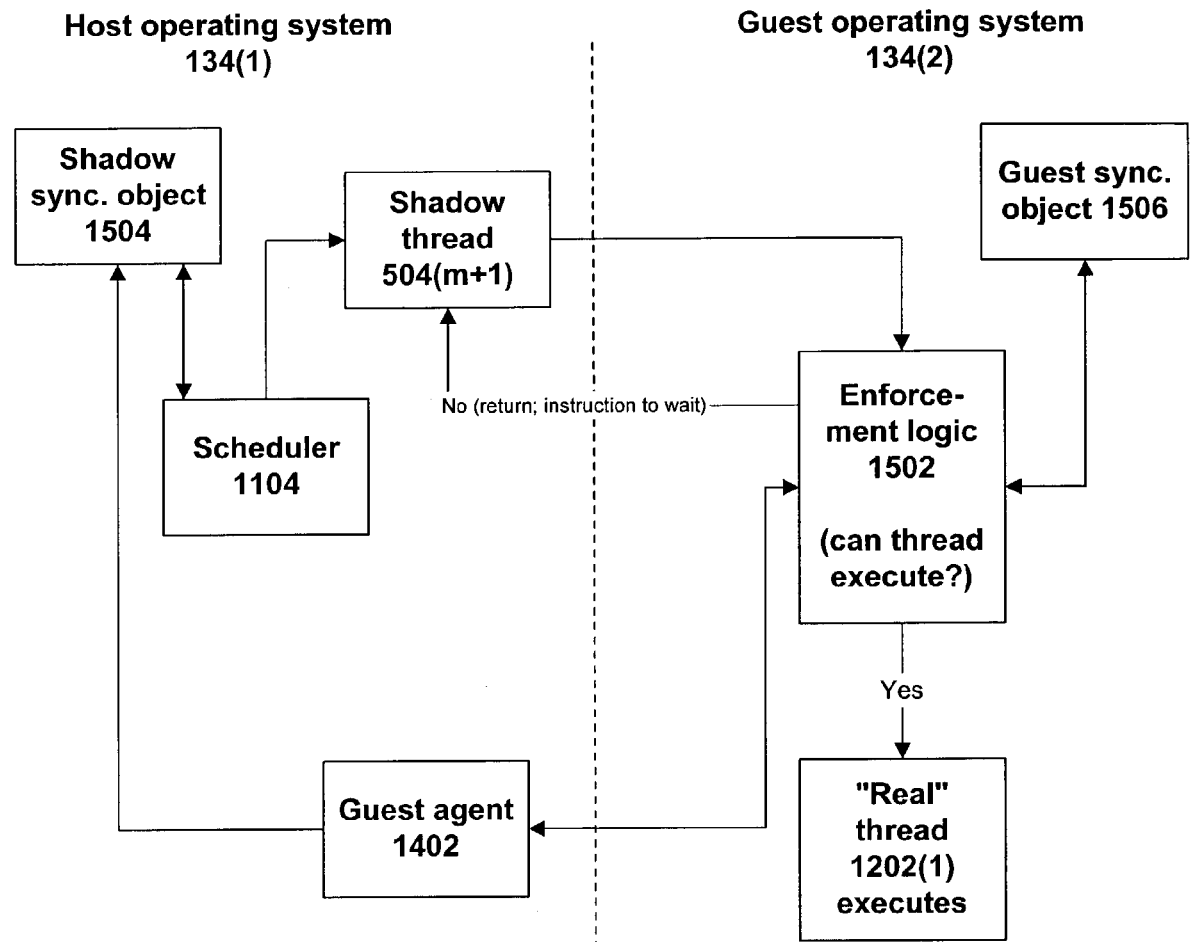
FIG. 15 is a block diagram of an exemplary architecture that supports the use of synchronization objects in a first execution environment on behalf of threads in a second execution environment.

FIG. 15 shows the use of a shadow synchronization object. Host operating system 134(1) maintains a scheduler 1104, which is used to schedule threads, including the "shadow" threads as described above. If scheduler 1104 schedules shadow thread 504(m+1), then shadow thread 504(m+1) causes a context switch to guest operating system 134(2), with a request to execute "real" thread 1202(1) (which corresponds to shadow thread 504(m+1)). Scheduler 1104 may make this decision based on having consulted shadow synchronization object 1504, which indicates that a particular resource that thread 504(m+1) is waiting on is available. If "real" thread 1202(1) needs to wait for a particular resource, then shadow thread 504(m+1) should be designated as waiting for that resource, so that ideally shadow thread 504(m+1) will not be scheduled unless the resource is available.

Once the context is changed to guest operating system 134(2), enforcement logic 1502 in guest operating system 134(2) decides whether the thread is allowed to execute. In making that decision, guest operating system 134(2) consults guest synchronization object 1506. In theory, guest synchronization object 1506 and host synchronization object 1504 should agree on whether the resource that thread 1202(1) is waiting for is available. Thus, if scheduler 1104 has scheduled thread 504(m+1) based on the decision that the awaited resource is available, and no attack or error has taken place in host operating system 134(1), guest synchronization object 1506 should confirm that the resource is, in fact, available. However guest synchronization object 1506 exists as a check again the possibility that—through either erroneous or malicious manipulation of scheduler 1104 or host synchronization object 1504—thread 1202(1) may have been invoked when its awaited-for resource is not available. Thus, if guest synchronization object 1506 indicates that the resource is not available, then thread 1202(1) does not execute, and the context is changed back to host operating system 134(1) so that shadow thread 504(m+1) can be returned to the waiting state. On the other hand, if guest synchronization object 4106 confirms that the resource that thread 1202(1) is waiting for is available, then thread 1202(1) is permitted to run.

If guest operating system 134(1) becomes aware that a resource is unavailable (e.g., as a result of events brought about by thread 1202(1), or for any other reason), then enforcement logic 1502 ensures that guest synchronization object 1506 reflects this fact. Additionally, enforcement logic 1502 directs that a corresponding change be made to host synchronization object 1504. This change can be made, for example, through guest agent 1402, or through a shadow thread 504(m+1). Guest agent is described above in connection with FIG. 14. Although FIG. 14 shows the functionality of guest agent 1402 as being to create shadow threads, in a more general case guest agent 1402 can be adapted to perform any functions within host operating system 134(1) on behalf of guest operating system 134(2)—including issuing requests to change synchronization objects.

Variations on the above theme can be designed for any type of synchronization object, such as semaphores, events, mutexes, etc.

Interrupt Handling

As is known in the art, an interrupt transfers control to an interrupt service routine, typically with the register contents intact, or approximately intact. Generally, there is a piece of "interrupt dispatch code" that invokes one of a plurality of "interrupt service routines" ("ISR"), based on the nature of the interrupt. An ISR performs the substantive work of handling the interrupt. Before the interrupt dispatch code invokes one of the ISRs, the dispatch code saves register state so that (a) if the interrupted thread is immediately re-scheduled, no register data is lost, and (b) if the thread is suspended so that another thread can run, no information is leaked to the newly started thread.

For a conventional operating system, the kernel owns all or most interrupt service routines, even when user-mode code is running. In the case of a virtual machine monitor, the virtual machine monitor generally owns all or most ISRs, even when hosted OSs or applications are running.

However, when both host and guest operating systems are running according to the model shown in FIG. 2, the operating systems can be configured so that the host and the guest own different ISRs, and the appropriate processor registers may be adjusted so that when the host is running, the host ISRs are invoked, and when the guest is running, the guest ISRs are invoked (and during transitions between the host and guest, interrupts are disallowed).

Within this model, when the host is running, the host ISR is called in the normal way. In most cases, no further action needs to be taken. However, if the ISR needs to be serviced by a guest handler, a waiting guest thread is awoken to service the interrupt using the mechanisms already described.

Figure 16:
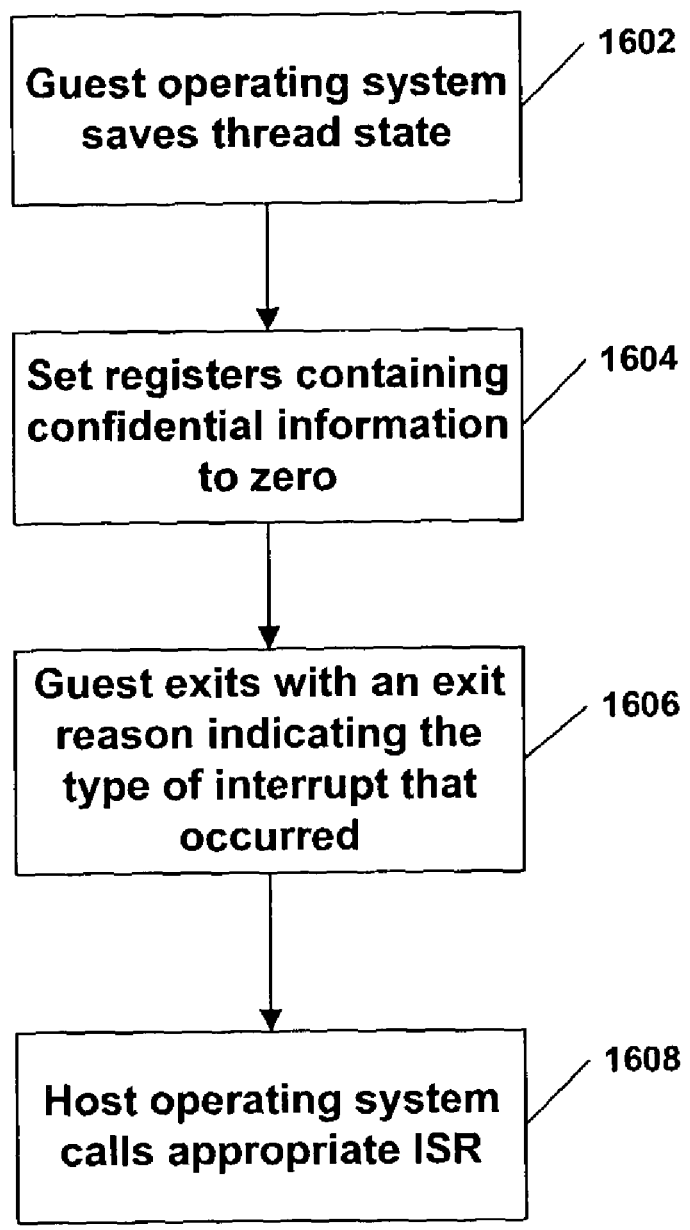
FIG. 16 is a flow diagram of an exemplary process to use a first execution environment to handle interrupts on behalf of a second execution environment.

When the guest is running, then the guest ISR is called. Since the guest operating system typically contains fewer device drivers than the host, it will commonly be the case that the guest will wish to invoke the host operating system and its drivers to service the device interrupt. The guest can securely invoke the host operating system and its drivers using the following steps (which are shown as a process in FIG. 16):

The guest operating system saves all thread state in the appropriate thread state block, and set the thread state to "runnable" so that the thread can be restarted (block 1602).

The guest operating system sets all registers that may contain confidential data to zero (or to some value that gives away no information about what the registers contained) (block 1604). Alternatively the guest may load the register contents held by the shadow thread before the guest was invoked.

The guest exits with the "exit reason" indicating that an interrupt of a particular kind has occurred, so that the host operating system can service the interrupt (block 1606). In other words, the guest operating system should make it appear to the host as if the interrupt occurred in the host.

The host operating system will call the appropriate ISR to handle the interrupt condition (block 1608). On completion of the ISR, the host operating system will typically continue execution of the servicing thread (unless the ISR invoked the scheduler, in which case another thread may be started).

After the interrupt has been serviced, the shadow thread that corresponds to the guest thread that was executing at the time of the interrupt is restarted, and may re-schedule the guest with the instruction "continue executing thread n."

Implementation Scenarios and Examples

Features of the invention have been described above in the context of certain specific examples, such as the use of two operating systems on the same computer, or the use of a security monitor. However, the invention may be deployed or implemented in a wide variety of scenarios. The following describes some example scenarios in which the invention may be deployed or implemented.

First, inasmuch as the features of the present invention facilitate both interaction and separation between two entities, these entities may be, for example:

Any collection of programs, where at least one of the programs uses at least one service of at least one of the other programs. These programs may or may not be running on the same computer.

Operating systems, or components thereof.

Additionally, the techniques may be used in the setting of any type of partitioned machine. For example, a base layer (VMM, Exokernel, SK) may host all the operating systems (guests). All guests are in principle peers. However, they are free to implement dependency relationships that the base layer does not care about (e.g. a nexus (guest 1) uses an ordinary operating system (guest 2) to communicate with a keyboard). Some examples of this scenario include:

The case where the programs are guest operating systems that are hosted by a security kernel (SK—as described in the paper). The SK serves to isolates the guests (e.g. by means of PTEC or shadow page tables), may allow guests to interact in certain constrained ways across the isolation barrier, exports at least one device to at least one guest, and can export DMA ("direct memory access") devices to guests and uses some mechanism to restrain DMA devices under the control of guests.

The case of a traditional VMM, wherein the VMM supports isolation of plural operating systems, implements all (or most) device drivers, and exposes virtual devices to the operating systems.

The case where plural operating systems are used in conjunction with a traditional exokernel.

The case where plural operating systems are running under a type of virtual machine monitor that runs "on top" of a host operating system, and that uses the host's drivers. This case may also include the special situation in which a virtual machine monitor runs on top of a host operating system, but is protected from the host.

It should further be noted that, inasmuch as the present invention can be used to facilitate some type of cooperation among various guests or between the host and guests, it should be noted that there are various versions of this collaboration. These versions include:

Collaboration managed by the base layer (security kernel, security monitor, VMM, exokernel, etc.). Typically, the collaborating guest (or host operating system) may not even be aware or the fact that any collaboration is going on or even that there are other guests (or a host) that one could collaborate with. Virtualization (as implemented by a VMM) means that the guest operating system generally has no way of telling whether it is alone on the machine or whether it is sharing the machine with a VMM and other guests. For example, when a guest of a VMM (of the type that runs on top of a host operating system) writes to a file, the guest is ultimately invoking (through the VMM) a device driver of the host operating system. However, the guest operating system may have no way to determine that this is the case.

Collaboration managed by the guests (and/or host): Two or more guests (and/or the host) are written, such that they are aware of each other (or at least one is aware of the other) and such that they implement any one of the collaboration schemes we describe. The base layer (security kernel, security monitor, VMM, exokernel, etc.) may allow the guests to set up some basic communication channels but, beyond this, may not be aware of whether, and how, the guests cooperate. For example, the "nexus" guest may write a file by calling directly into the ordinary operating system guest. In this case, the nexus guest knows that it is invoking the regular operating system. In a related example one of the communication/collaboration partners may be the base layer itself.

Other scenarios or mechanisms that can be used to the features described above include:

Building a base layer (VMM, security kernel, security monitor, exokernel, etc.) that uses a device exclusion vector (DEV) to protect itself from DMA devices. As a related example, a base layer could be built such that at least one DMA device can be directly accessed by at least one guest.

Cooperation between guests (or host or base layer) where one participant (P1) requests an action, a second participant (P2) assists in the action, and encryption is used to prevent P2 from observing at least some of the data it receives while assisting in the action, and/OR a MAC, digital signature etc. is used to protect the integrity of at least some of the data P2 receives while assisting in the action. For example, if P1 is a nexus and P2 is an ordinary operating system, P2 may assist P1 in communicating with an input device (e.g., keyboard, mouse, scanner camera, camcorder, TV tuner), even while the content of the communication with the device is protected from P2. As another example, a regular operating system may help the nexus in storing and retrieving data on hard disk, floppy disk or any other storage device. As a further example, the regular operating system may help the nexus in communication over a network by implementing all the lower network layers. Alternatively, certain types of cooperation between guests (and/or hosts and/or the base layer) may take place even in the absence of an encryption and/or authentication scheme.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for isolating a plurality of computing environments interacting on a computing device, comprising acts of:
running a first computing environment and a second computing environment on the computing device, wherein the first computing environment hosts the second computing environment by sharing computing resources of the first computing environment with the second computing environment;
enabling interaction between the first and second computing environments to share the computing resources of the first computing environment with the second computing environment while isolating the first computing environment from the second computing environment, wherein enabling interaction comprises:
receiving data by the second computing environment from the first computing environment in a first state that is writeable by the first computing environment;
isolating the first computing environment from the second computing environment by placing the data into a second state that is readable by the second computing environment but not modifiable by the first computing environment during a time in which the first computing environment and second computing environment are allowed to interact; and
performing a validation test by the second computing environment on the data to ensure that the second computing environment will continue to operate according to a predetermined specification.

2. The method of claim 1, wherein said first state and said second state are mutually distinct data storage areas, and wherein the act of placing the data into the second state comprises:
copying the data from the first state to the second state.

3. The method of claim 1, wherein said first state and said second state are the same physical data storage area, and wherein the act of placing the data into the second state comprises depriving the first computing environment of the ability to write said physical data storage area.

4. The method of claim 3, wherein the act of placing the data into the second state is performed without copying any of the data.

5. The method of claim 1, wherein said first state and said second state each comprise a set of registers on a processor, wherein said first computing environment executes on the processor to write the data into the set of registers, and wherein the second computing environment executes on the processor to read the set of registers; the first computing environment and the second computing environment not being able to execute on the processor at the same time, whereby the set of registers constitute the first state while the first computing environment is executing on the processor, and the set of registers constitutes the second state while the second computing environment is executing on the processor.

6. The method of claim 1, wherein the first computing environment accesses a memory through a mapping, the mapping being configurable such that at least some part of the memory can be made unwriteable by the first computing environment, the computing environment to which the mapping corresponds, and wherein the act of placing the data into the second state comprises:
configuring the mapping such that said some part of the memory is unwriteable by the first computing environment.

7. The method of claim 6, wherein each unit of the memory has a physical address, wherein the first computing environment access the memory based on virtual addresses, and wherein the mapping maps the virtual addresses to the physical addresses.

8. The method of claim 7, wherein the memory is divided into pages, wherein the mapping maps virtual addresses to physical addresses with per-page granularity, said some part of the memory comprising one or more the pages.

9. The method of claim 6, wherein the mapping can designate one or more parts of the memory as being only readable by the first computing environment, and wherein the act of configuring the mapping comprises:
configuring the mapping to designate said some part of the memory as being only readable by the first computing environment.

10. The method of claim 6, wherein the mapping can designate one or more parts of the memory as being not present, and wherein the act of configuring the mapping comprises:
configuring the mapping to designate said some part of the memory as being not present.

11. The method of claim 6, wherein the act of configuring the mapping comprises:
removing, from the mapping, a reference to said some part of the memory.

12. The method of claim 1, wherein said act of placing the data into the second state comprises:
copying the data from the first state to a third state that is different both from said first state and from said second state; and
copying the data from the third state to the second state.

13. The method of claim 12, wherein the third state is accessible only by a security monitor that is distinct from both the first computing environment and the second computing environment, the security monitor being trusted by the second computing environment, and wherein the security monitor performs the acts of copying the data from the first state to the third state, and of copying the data from the third state to the second state.

14. The method of claim 12, wherein the first computing environment and the second computing environment have shared access to the first state, and wherein the second computing environment copies the data into the second state.

15. The method of claim 1, wherein the first computing environment comprises a first execution environment, and wherein the second computing environment comprises a second execution environment.

16. The method of claim 15, wherein the first execution environment comprises a first operating system, and wherein the second execution environment comprises a second operating system.

17. The method of claim 16, wherein the first operating system hosts the second operating system by providing at least some infrastructure used by the second operating system.

18. The method of claim 17, wherein said infrastructure comprises at least one of:
a memory; and
a processor.

19. The method of claim 17, wherein a security monitor that is distinct both from the first operating system and from the second operating system and that is trusted by the second operating system performs the act of placing the data into the second state, wherein the security monitor enforces a separation between the first and second computing environments.

20. The method of claim 16, wherein the first execution environment is expected to conform its behavior to a first specification, wherein the second execution environment is expected to conform its behavior to a second specification, wherein the expectation that the second execution environment will behave according to the second specification is relatively greater than the expectation that the first execution environment will conform its behavior to the first specification, and wherein the method further comprises:
  performing said validation test, wherein said validation test provides a level of assurance that the data will not cause the second execution environment to behave in a manner that would violate the second specification.

21. A computer-readable storage medium comprising computer executable instructions that are executable by a computer to perform acts for isolating a plurality of computing environments interacting on a computing device, the acts comprising:
  running a first computing environment and a second computing environment on the computing device, wherein the first computing environment hosts the second computing environment by sharing computing resources of the first computing environment with the second computing environment;
  enabling interaction between the first and second computing environments to share the computing resources of the first computing environment with the second computing environment while isolating the first computing environment from the second computing environment, wherein enabling interaction comprises:
    accepting data into a first state that is writeable by the first computing environment;
    placing the data into a second state that is readable by the second computing environment; and
    ensuring that the second state is not writeable by the first computing environment during a time in which the first computing environment and second computing environment are allowed to interact; and
    performing a validation test on the data to ensure that the second computing environment will continue to operate according to a predetermined specification, wherein:
    the first state comprises a first portion of memory;
    the second state comprises a second portion of memory different from said first portion of memory; and
    the act of placing the data into the second state comprises copying the data from the first portion of memory to the second portion of memory.

22. The computer-readable medium of claim 21, wherein the instructions to perform the act of placing the data into the second state comprise instructions to perform acts comprising:
  running the second computing environment on a processor that comprises a set of registers, wherein the first state comprises the set of registers when the first entity is running on the processor, and wherein the second state comprises the set of registers when the second computing environment is running on the processor, whereby the second computing environment retrieves the data from the set of registers;
  copying the data from a first portion of a memory to a second portion of the memory that is different from said first portion of the memory, wherein the first state comprises the first portion of the memory, and wherein the second state comprises the second portion of the memory; and
  configuring a mapping to make the first state unwriteable by the first computing environment, wherein the first state comprises a third portion of the memory, wherein the first computing environment accesses the memory through the mapping, and wherein the mapping is configurable so as to make at least some part of the memory unwriteable by the first computing environment.

23. The computer-readable medium of claim 22, wherein the computer-executable instructions are adapted to perform acts further comprising:
  determining whether the communication of data from the first computing environment to the second computing environment is to be performed by said running act, said copying act, or said configuration act, based on a criterion.

24. The computer-readable medium of claim 23, wherein said criterion comprises a size of the data.

25. The computer-readable medium of claim 21, wherein the act of copying the data from the first state to the second state comprises:
  copying the data from the first portion of the memory to a third portion of the memory that is different both from the first portion of the memory and from the second portion of the memory; and
  copying the data from the third portion of the memory to the second portion of the memory.

26. The computer-readable medium of claim 25, wherein the computer-readable medium further contains:
  logic that implements a security monitor that is trusted by the second computing environment, the security monitor being adapted to make the third portion of the memory inaccessible to the first computing environment and the second computing environment, the security monitor being further adapted to perform the acts of copying the data from the first portion of the memory to the third portion of the memory, and of copying the data from the third portion of the memory to the second portion of the memory.

27. The computer-readable medium of claim 21, wherein the first state and the second state each comprise a common portion of a memory, wherein the first computing environment accesses the memory through a mapping, the mapping being configurable so as to make at least some part of the memory unwriteable by the first computing environment, and wherein the act of placing the data into the second state comprises:
  configuring the mapping so as to make said portion of the memory unwriteable by the first computing environment.

28. The computer-readable medium of claim 27, wherein the act of configuring the mapping comprises:
  removing, from the mapping, a reference to said portion of the memory.

29. The computer-readable medium of claim 27, wherein the mapping can designate one or more parts of the memory as being only readable by the first computing environment, and wherein the act of configuring the mapping comprises:
  configuring the mapping to designate said portion of the memory as being only readable by the first computing environment.

30. The computer-readable medium of claim 27, wherein the mapping can designate one or more part of the memory as being not present, and wherein the act of configuring the mapping comprises:

configuring the mapping to designate said portion of the memory as being not present.

31. The computer-readable medium of claim 21, wherein said first state and said second state comprise a set of registers on a processor, wherein said act of accepting the data into the first state comprises:

executing the first computing environment on the processor, whereby the first computing environment places the data into the set of registers;

and wherein the act of placing the data into the second state comprises:

executing the second computing environment on the processor, whereby the second computing environment retrieves the data from the set of registers; the set of registers constituting the first state when the first computing environment executes on the processor, and the set of registers constituting the second state when the second computing environment executes on the processor.

32. The computer-readable medium of claim 21, wherein the first computing environment comprises a first execution environment, and wherein the second computing environment comprises a second execution environment.

33. The computer-readable medium of claim 32, wherein the first computing environment comprises a first operating system, and wherein the second computing environment comprises a second operating system.

34. The computer-readable medium of claim 32, wherein said first execution environment is expected to conform its behavior to a first specification, wherein the second execution environment is expected to conform its behavior to a second specification, wherein the expectation that the second execution environment will behave according to the second specification is relatively greater than the expectation that the first execution environment will conform its behavior to the first specification, and wherein the computer-executable instructions are further adapted to perform acts comprising:

performing said validation test to ensure that the data will not cause the second execution environment to behave in a manner that would violate the second specification.

35. The computer-readable medium of claim 21, wherein the computer-readable medium further contains:

logic to implement a security monitor which is trusted by the second computing environment, the security monitor being adapted to perform the act of placing the data into the second state, wherein the security monitor enforces the separation between the first and second computing environments.

36. A method for isolating a plurality of computing environments interacting on a computing device, comprising acts of:

running a first computing environment and a second computing environment on the computing device, wherein the first computing environment is a host operating system of the computing device which shares computing resources of the first computing environment with the second computing environment;

enabling interaction between the first and second computing environments to share the computing resources of the first computing environment with the second computing environment while isolating the first computing environment from the second computing environment, wherein enabling interaction comprises:

receiving data from the first computing environment in a first state that is writeable by the first computing environment; and isolating the first computing environment from the second computing environment by placing the data into a second state that is readable by the second computing environment but not modifiable by the first computing environment during a time in which the first computing environment and second computing environment are allowed to interact; and performing a validation test on the data to ensure that the second computing environment will continue to operate according to a predetermined specification, wherein:

the first state comprises a first portion of memory;

the second state comprises a second portion of memory different from said first portion of memory; and the act of placing the data into the second state comprises copying the data from the first portion of memory to the second portion of memory.

* * * * *